United States Patent [19]

Ibarreche Mendia et al.

[11] Patent Number: 5,329,763

[45] Date of Patent: Jul. 19, 1994

[54] THRUST VECTORING VARIABLE GEOMETRY EXHAUST NOZZLE FOR GAS TURBINES

[75] Inventors: Jose I. Ibarreche Mendia, Gorliz; Jose Rivacoba Urruela, Las Arenas, both of Spain

[73] Assignee: Sener, Ingenieria Y Sistemas, S.A.

[21] Appl. No.: 20,669

[22] Filed: Feb. 22, 1993

[30] Foreign Application Priority Data

Feb. 20, 1992 [ES] Spain ............................... 9200369

[51] Int. Cl.$^5$ .............................................. F02K 1/00
[52] U.S. Cl. ..................................... 60/232; 60/228; 239/265.19; 239/265.39
[58] Field of Search ................................ 60/228, 232; 239/265.11, 265.19, 265.33, 265.35, 265.37, 265.39

[56] References Cited

U.S. PATENT DOCUMENTS

| | | |
|---|---|---|
| 4,662,556 | 5/1987 | Gidlund . |
| 4,690,330 | 9/1987 | Robinson et al. . |
| 4,994,660 | 1/1991 | Hauer . |
| 5,039,014 | 8/1991 | Lippmeier . |
| 5,082,182 | 1/1992 | Bruchez et al. ............ 239/265.39 |
| 5,150,839 | 9/1992 | Reedy . |
| 5,174,502 | 12/1992 | Lippmeier et al. .......... 239/265.39 |

FOREIGN PATENT DOCUMENTS

| | | |
|---|---|---|
| 0029773 | 11/1980 | European Pat. Off. . |
| 0281264 | 2/1988 | European Pat. Off. . |
| 1381397 | 2/1971 | United Kingdom . |
| 2196587 | 9/1981 | United Kingdom . |
| 2124562 | 7/1983 | United Kingdom . |
| 2241539 | 2/1991 | United Kingdom . |

OTHER PUBLICATIONS

PCT Application #9105197; United Technologies Corporation.
Aviation Week and Space Technology, vol. 136, No. 9, Mar. 1992, pp. 44–46 Stanly W. Kandebo, "GE, Pratt Ground Tests Validate Nozzle Concepts".

*Primary Examiner*—Richard A. Bertsch
*Assistant Examiner*—William Wicker
*Attorney, Agent, or Firm*—Ostrolenk, Faber, Gerb & Soffen

[57] ABSTRACT

A thrust vectoring variable geometry exhaust nozzle for gas turbines, which includes a convergent section (2) followed, in the direction of the flow, by a divergent section (3), both formed by master (4 and 5) and slave petals (41 and 42), whose convergent section (2) defines a throat (15) having a variable area. The divergent section (3) has variable geometry in order to orientate the thrust, and includes a governing and external radial support system for regulating the throat area (15), and a governing system for regulating the vectoring of the thrust. Both system are formed by a single governing system consisting of three annular pieces (6,7 and 8), concentric among themselves and with the axis of the turbine, and by a plurality of linear actuators (9). The master petals (5) of the divergent section (3) are transversely subdivided into at least two segments (5a, 5b).

25 Claims, 32 Drawing Sheets

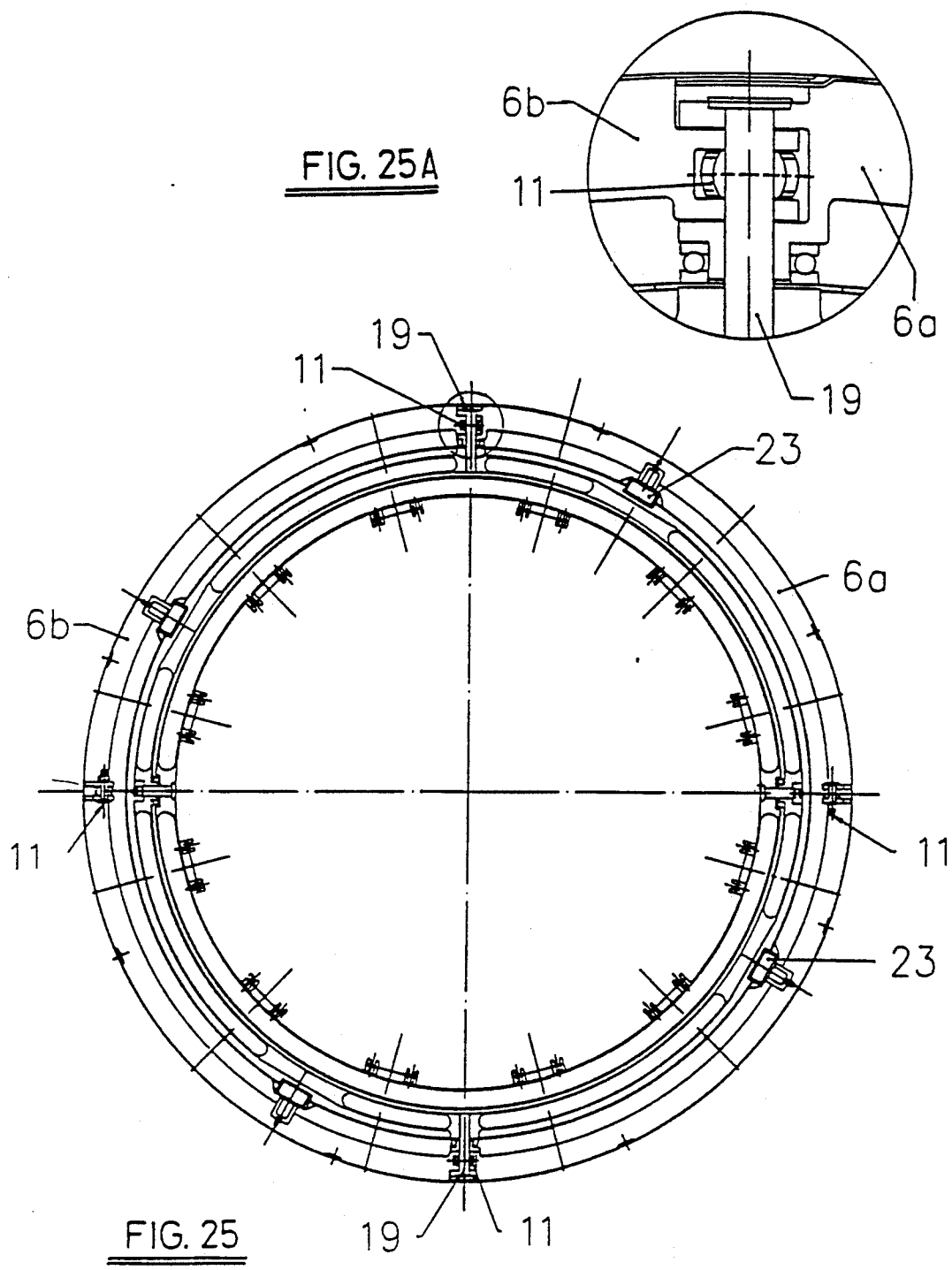

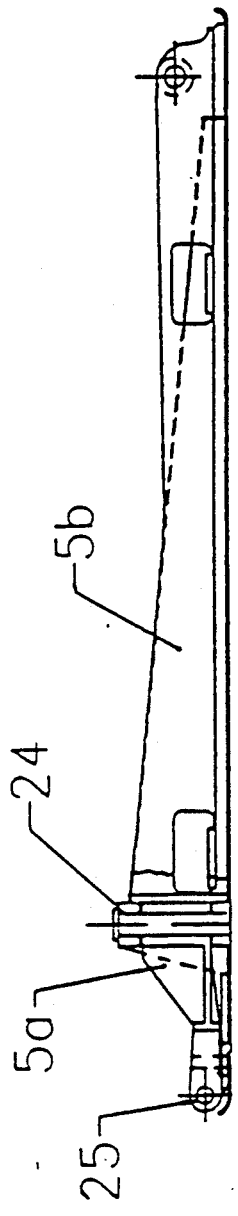
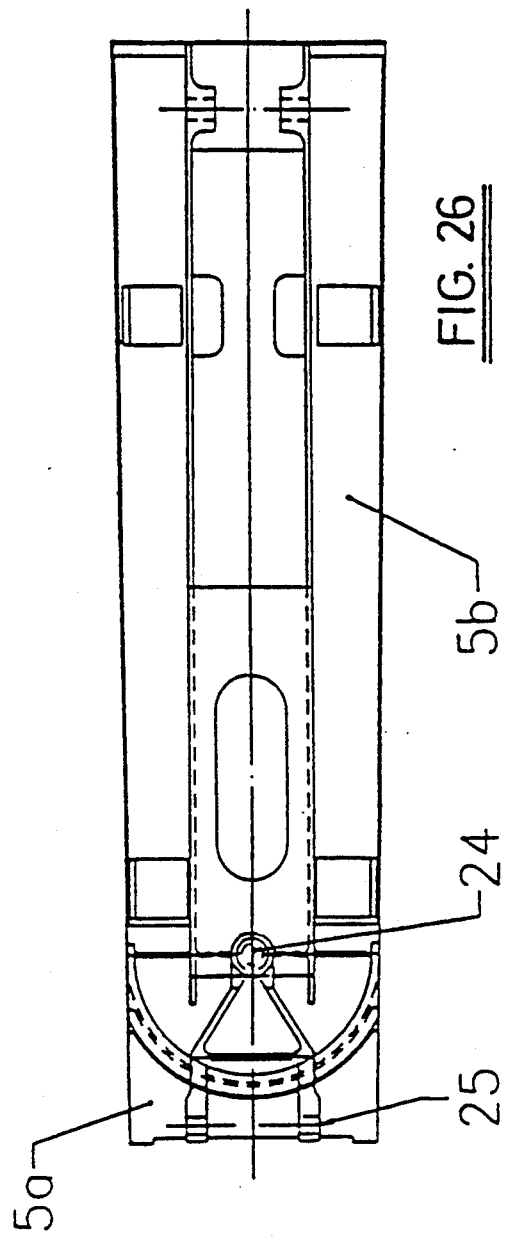

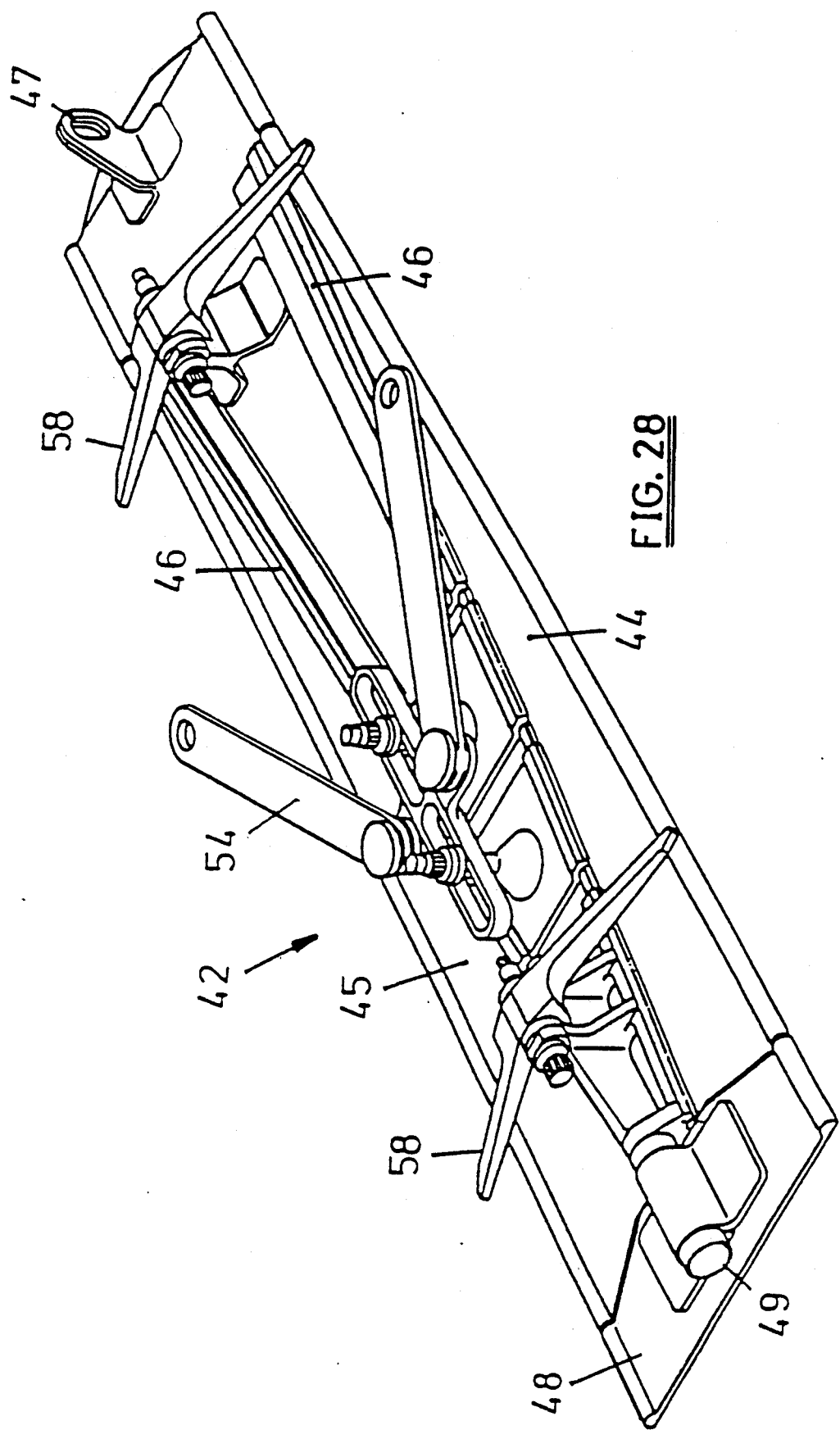

THRUST VECTORING VARIABLE GEOMETRY EXHAUST NOZZLE FOR GAS TURBINES

BACKGROUND OF THE INVENTION

1. Field of the Invention

The present invention relates to a thrust vectoring variable geometry exhaust nozzle for gas turbines, especially intended for gas turbines used as the means of propulsion in aviation.

More particularly, the exhaust nozzle of the present invention is of the axisymmetric type consisting of a convergent section followed, in the direction of the flow, by a divergent section, both formed from master petals arranged circumferentially about the centerline of the turbine to define a thrust exhaust duet and connected to each other by cylindrical linkage having axes perpendicular to the centerline of the turbine and slave petals also connected to each other by cylindrical linkages. The convergent section defines a throat of variable area and the divergent section has a variable geometry in order to orientate the thrust in any direction on a theoretical cone located around the centerline of the turbine.

2. Description of the Related Art

The maneuverability of aircraft is an essential and important factor. This maneuverability, which to date has been achieved by aerodynamic forces, can be substantially improved by modifying the vectoring of the thrust of the nozzle starting from its normal axial direction of action.

The vectoring of the thrust of exhaust nozzles has for many years been used in rocket engines. There the systems are much simpler since the exhaust nozzles have constant geometry.

Variable geometry convergent-divergent exhaust nozzles have only been recently introduced in supersonic aircraft powered by turboreactor or turbofan engines. In this class of exhaust nozzles, the vectoring systems for the thrust are still not in an operational state, but are only at the research and development phase. Those that are at a more advanced phase are the bidimensional type, in which the thrust is orientated solely in one plane.

Carrying out the vectoring of the thrust in exhaust nozzles with axial symmetry has a special advantage, since the direction of the thrust can be varied in any axial plane, the pitch and yaw planes being particularly important.

Several patents exist on mechanisms for vectoring of the thrust in this class of exhaust nozzles, since it theoretically possible to carry this out in various ways, although it is very difficult to ensure that there are no major complications. U.S. Pat. No. 4,994,660 and European Patent No. 281,264 describe vectoring mechanisms for the thrust in exhaust nozzles of this class and their systems of action, and furthermore, describe the special advantages shown by these mechanisms in comparison with the other known systems.

The most commonly applied mechanism for creating a variable geometry axisymmetric convergent-divergent exhaust nozzle, as can be seen in different turbines currently in operation or being developed, consists of a convergent section comprising a plurality of convergent master petals, interleaved among which are convergent slave petals for sealing the free spaces or interstices between neighboring master petals. Beyond this convergent section is a divergent section consisting of the same plurality of divergent master petals interleaved among which are a plurality of divergent slave petals for the sealing. The upstream end, according to the direction of the gas flow, of each divergent master petal is joined by means of a linkage to the convergent master petal, with which it forms a pair. The divergent master petal in turn is joined at a point intermediate its downstream end to the downstream end of a strut, by means of a spherical linkage. The upstream end of each convergent master petal and that of each strut are joined by means of cylindrical linkages to a rigid structure which normally forms part of the post-combustion housing of the turbine. The variation in the area of the throat A8 is achieved by means of a roller which is pulled by a ring that is moved axially and is governed by a plurality of actuators connected to it via spherical linkages and which act on a cam which in turn forms an integral part of the convergent master petal.

It has been well known in the prior art, in fields such as mining, to use a water cannon to deviate the hydraulic jet omindirectionally. The water cannon consists of a fixed tube upstream and another tube with a conical extension located downstream. The tubes are interconnected by means of a spherical bearing or a universal-type bearing that allows the conical tube to be orientated with respect to the fixed tube. When dealing with powerful hydraulic cannons, the vectoring of the conical tube is done by a system of at least three bars which, arranged around the tube, interlink the downstream projecting end of the tube to the external ring of the universal bearing, so that when this is inclined, the corresponding orientating transverse force is transmitted to that projecting end.

Moreover, in recent decades in the field of turbopropulsion turbines, certain vectoring systems for the thrust have been proposed and developed. All these systems can be classified into three major groups, i.e.:

1) Those which orientate the whole exhaust nozzle upstream of the throat.
2) Those which orientate the divergent part of the exhaust nozzle, i.e., the whole part located immediately downstream of the throat.
3) Those which orientate the flow at the outlet or somewhat more downstream of the outlet of the exhaust nozzle.

Orientating the whole exhaust nozzle upstream of the inlet section has the drawback that the perturbations induced by the vectoring are transmitted upstream of the turbine and require a highly complicated sealing device for the interstices between the different mobile components.

The sealing of these interstices is simplified in the case of exhaust nozzles orientable from their throat section. Even so, a seal needs to be provided for the slot formed between one flat convergent petal and its pair, the divergent petal, also being flat with which it is linked via a spherical bearing.

Moreover, during vectoring, the geometry of the longitudinal interstices between adjacent divergent petals alters, which corresponding approximately to that of a rectangle, becomes that of a ruled surface whose sides cease to be parallel. In order to prevent such a distorted geometry in the slot, a solution is shown by U.S. Pat. No. 4,994,660, consisting of a dorsal bar on which is mounted a plurality of segments that can rotate around that bar. Although this solution solves the problem of sealing the slot, the set of segments constitutes a very rough wall with a multitude of ridges transverse to the direction of the flow.

In the case of exhaust nozzles fitted with flow orientators at the outlet, the resulting system is very heavy and voluminous.

A characteristic of all the known vectoring systems is the presence of the two independently acting systems, one to vary the geometry of the throat and that of the outlet axisymmetrically, and another to orientate the supporting struts at the downstream end of the divergent petals, as explained in U.S. Pat. No. 4,994,660. Although such an exhaust nozzle has the flexibility for optimizing the law of ratios between the throat area and the outlet area and can accommodate itself to changes for different requirements, the system suffers from complexity, mass and cost.

SUMMARY OF THE INVENTION

The aim of the present invention is to produce an exhaust nozzle which, having a favorable law of ratio between the area of the throat A8 and the outlet A9 throughout the whole cycle of the design of the turbine and being flexible in order to select and adjust that law, fulfills a variety of turbine cycles.

The exhaust nozzle that is the subject of this invention is of the second type indicated above, with a convergent section and a divergent section, both comprising master petals and slave petals, and which includes governing and external radial support means for regulating the throat area and governing means for regulating the vectoring of the thrust.

The variation of the throat area and the vectoring of the thrust of the axisymmetric exhaust nozzle of the present invention are carried out by means of a single governing system. This single system comprises three rings concentric among themselves and with the centerline of the turbine, and having a plurality of linear actuators linked by their upstream end to the fixed structure of the turbine.

The rings are connected together and to the fixed structure of the turbine via linkage elements and guide devices which allow the axial displacement of the three rings in equal magnitude with respect to the fixed structure of the turbine, as well as a relative rotary movement between the intermediate and outer rings and with respect to the inner ring in any direction, thereby allowing the outer ring to be inclined in any direction with the centerpoint of rotation in the centerline of the turbine.

Each convergent master petal is connected at a point in its upstream half to the inner ring by means of a cylindrical linkage tangential to a theoretic circumference which is concentric with the turbine centerline and located on a theoretical plane which is perpendicular to the turbine centerline. The outer ring is connected by means of spherical linkages to the downstream end of the linear actuators.

The master petals of the divergent section are subdivided transversely into at least two segments that are connected to each other by means of a cylindrical linkage with axes perpendicular to that of the linkage between the master petals of the convergent and divergent sections. The downstream segment is connected to the outer ring via a strut that links the segment by means of a spherical linkage to the ring by means of a cylindrical linkage having an axis tangential to a theoretic circumference which is concentric with the turbine centerline and located on a theoretical plane which is perpendicular to the turbine centerline.

The outer ring can be either a single body or a of ring of segments interlinked with linkages. The ring of a single body requires a minimum of three linear actuators in order to vary the area of the throat A8 and to orientate the thrust. However, this arrangement does not allow the area of the outlet A9 to be varied for a fixed value of the area of the throat A8. Forming the outer ring from two half-rings moved by four linear actuators allows the area of the outlet A9 to be varied for a fixed value of the area of the throat A8.

Other features and advantages of the present invention will become apparent from the following description of the invention which refers to the accompanying drawings.

BRIEF DESCRIPTION OF THE DRAWINGS

FIG. 25 is a transverse cross-section, similar to FIG. 11, showing an alternative design of the rings.

FIG. 26 is an exterior plan view of a divergent master petal.

FIG. 27 is a side elevation view of the petal of FIG. 26.

FIG. 28 is a rear perspective view of a divergent slave petal.

DETAILED DESCRIPTION OF THE PREFERRED EMBODIMENTS

Figure 1:
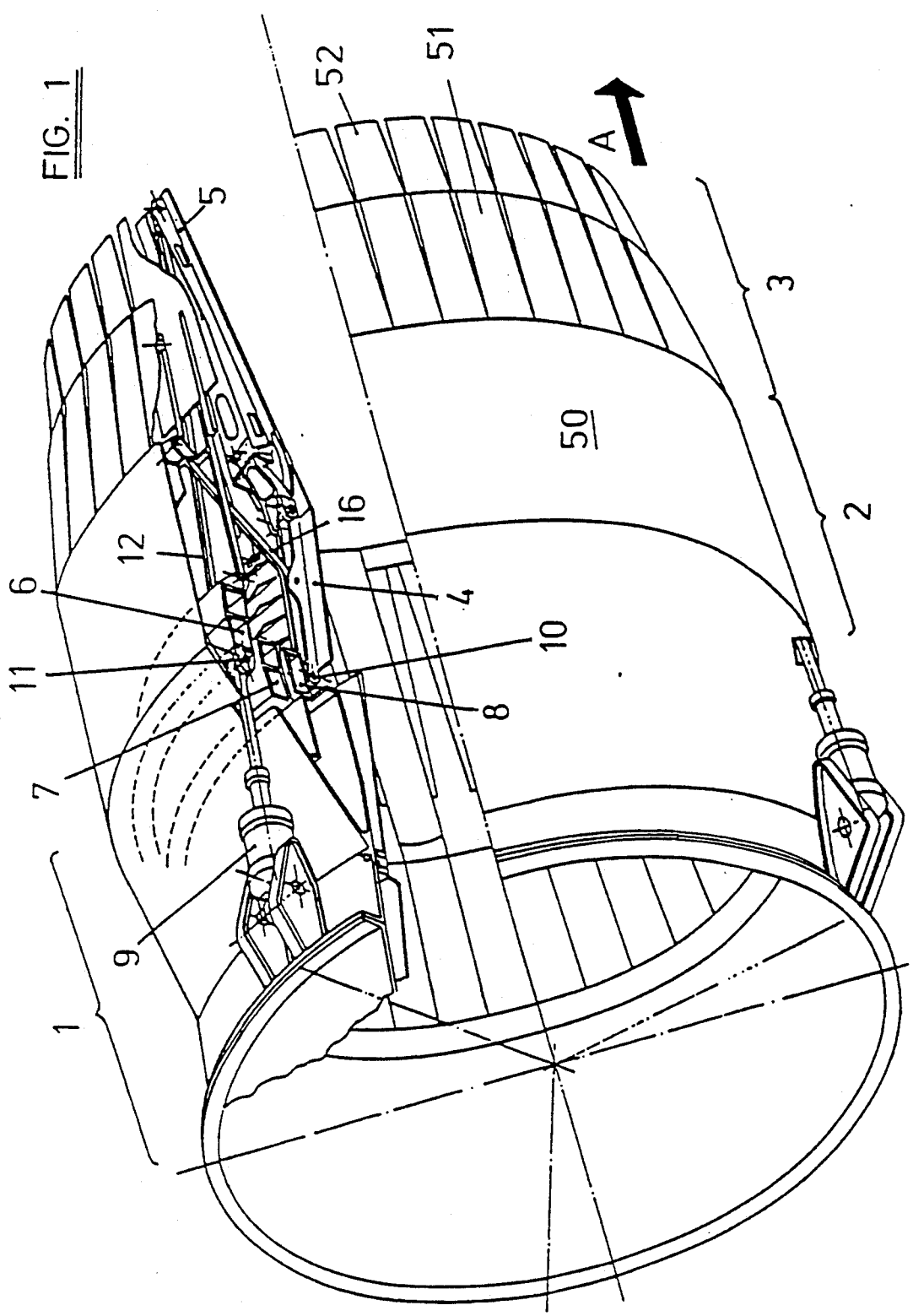
FIG. 1 is a perspective, partial cross-sectional view of an exhaust nozzle according to the present invention.

FIG. 1 illustrates a partial cross-sectional perspective view of an exhaust nozzle in accordance with the present invention. Arrow A shows the direction of the flow or circulation of the gases. As with traditional exhaust nozzles, the nozzle represented in FIG. 1 include a rear housing or fixed turbine structure 1, a convergent section 2 and a divergent section 3. The convergent section 2 comprises a plurality of master petals 4 and slave petals (not shown). In the same way, the divergent section 3 comprises master petals 5 and slave petals (not shown). The exhaust nozzle also includes a governing system for varying the throat area A8 and for the vectoring of the thrust, shown at 15, defined by the intersection between the convergent petals 4 and the divergent petals 5.

In accordance with the present invention, the variation in the throat area and the vectoring of the thrust is accomplished by means of a single governing system consisting of three rings 6, 7, and 8, concentric among themselves and with the centerline of the turbine, and by a plurality of linear actuators 9 which are linked at their upstream ends to the fixed structure of the turbine 1.

The convergent master petals 4 are connected at a point in their upstream half to the inner ring 8. In the example shown in FIG. 3, convergent master petals 4 are connected by their upstream ends to the inner ring 8. This connection is made by a cylindrical linkage 10 tangential to a theoretic circumference which is concentric with the turbine centerline and located on a theoretical plane which is perpendicular to the turbine centerline.

Figure 2:
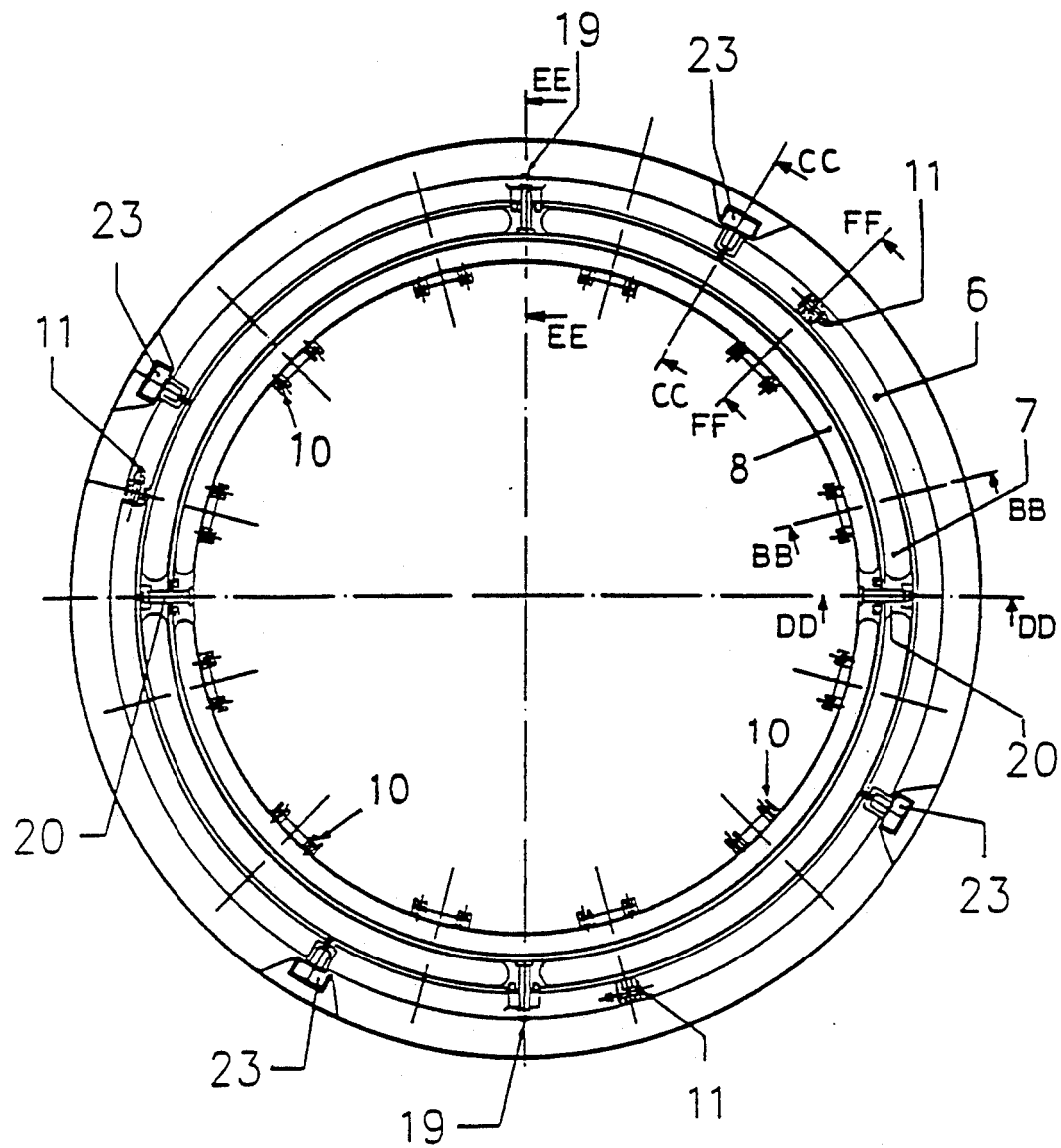
FIG. 2 is a transverse cross-section of the exhaust nozzle along line A—A of FIG. 9, illustrating the links between the elements of the simultaneous governing system for the throat area and the vectoring of the thrust.
Figure 10:
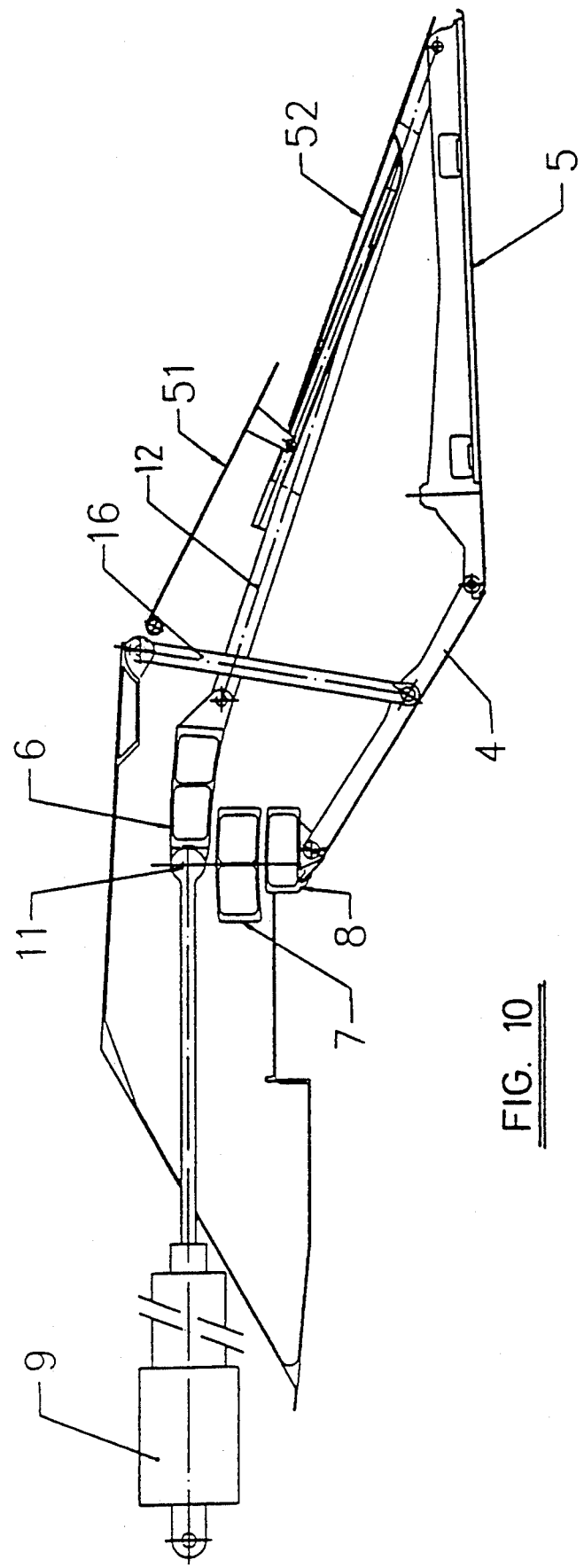
FIG. 10 is a longitudinal cross-section of the exhaust nozzle, along line F—F of FIG. 2, with the exhaust nozzle in the closed position and without vectoring of the thrust.

Connected to the outer ring 6 by means of spherical linkages 11, shown in FIGS. 2 and 10, are the downstream ends of the linear actuators 9. The outer ring 6 is also linked to the divergent master petals 5 by struts 12 mounted concentrically around the centerline of the turbine. The connection of the struts 12 to the outer ring 6 is accomplished by a cylindrical linkage 13, while the connection of the struts 12 to the divergent master petal 5 is made via a spherical linkage 14.

Figure 3:
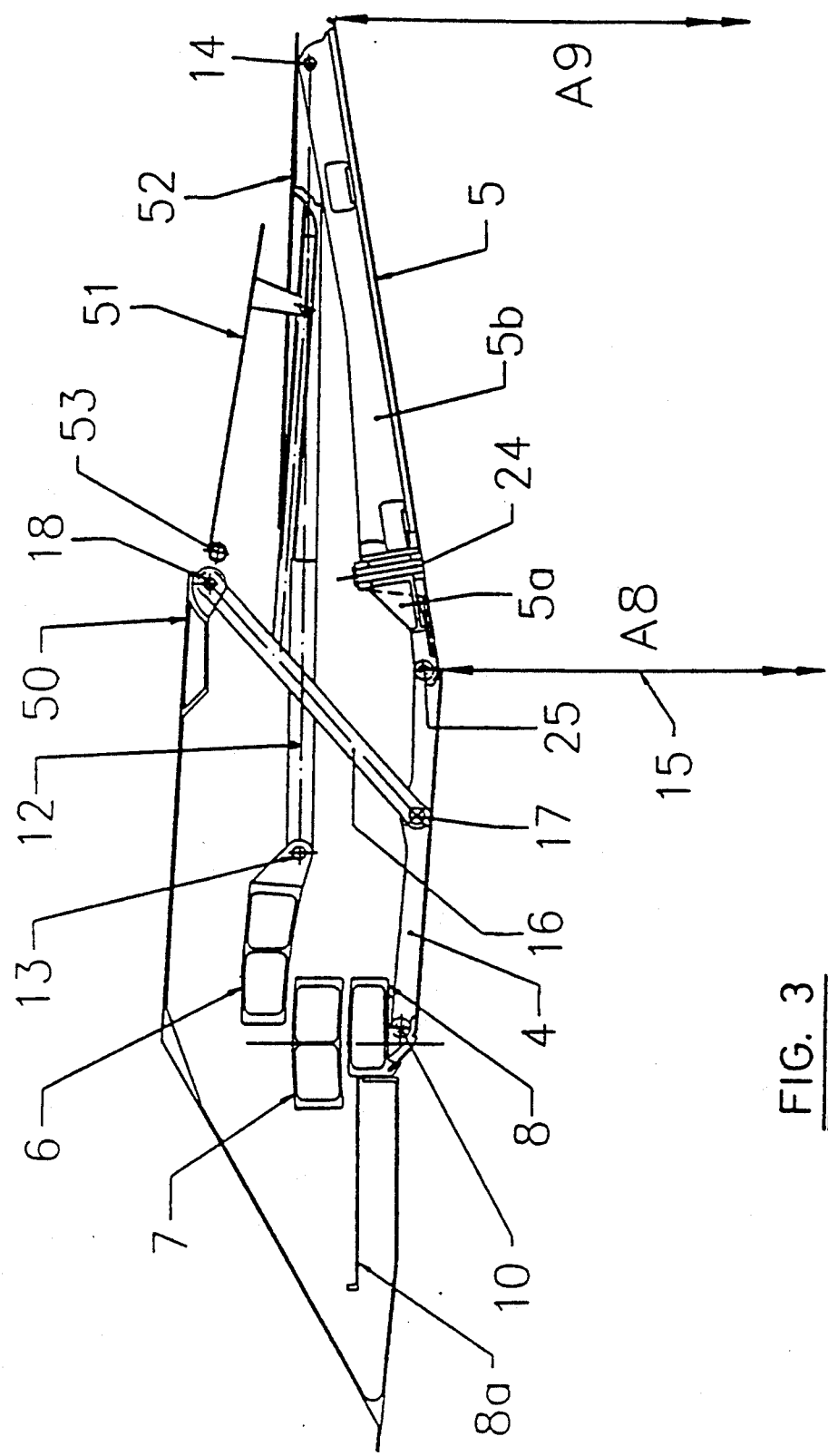
FIG. 3 is a longitudinal cross-section of the exhaust nozzle along line B—B of FIG. 2, showing the exhaust nozzle in its open position and without vectoring of the thrust.

The governing system for the exhaust nozzle also includes a mechanism for modifying the throat area 15. As shown in FIG. 3, the mechanism consists of a connecting rod 16 connected at one end by a linkage 17 to the convergent master petal 4, while at the opposite end it is connected to the fixed structure of the turbine by a linkage 18.

The rings 6, 7 and 8 are also linked to each other by devices that allow axial displacement of the set of three rings, in equal magnitude, with respect to the fixed structure of the turbine, as well as a relative rotary movement between the intermediate ring 7 and outer ring 6 and axial displacement of rings 6 and 7 with respect to the inner ring 8 in any direction. The outer ring 6 may be inclined in any direction, with the centerpoint of rotation being the centerline of the turbine. In this way, between the outer ring 6 and inner ring 8 and via the intermediate ring 7, a relative rotational movement in the space is allowed, defining a spherical joint. For this, the rings 6 and 7 are joined together by a cylindrical linkage defined by the shafts 19, shown in FIGS. 2 and 9, aligned in a diametrically opposite position. The rings 7 and 8 are joined together by another cylindrical linkage defined by the shafts 20, shown in FIGS. 2 and 8, also aligned one with the other in a diametrical position perpendicular in the shafts 19.

Figure 8:
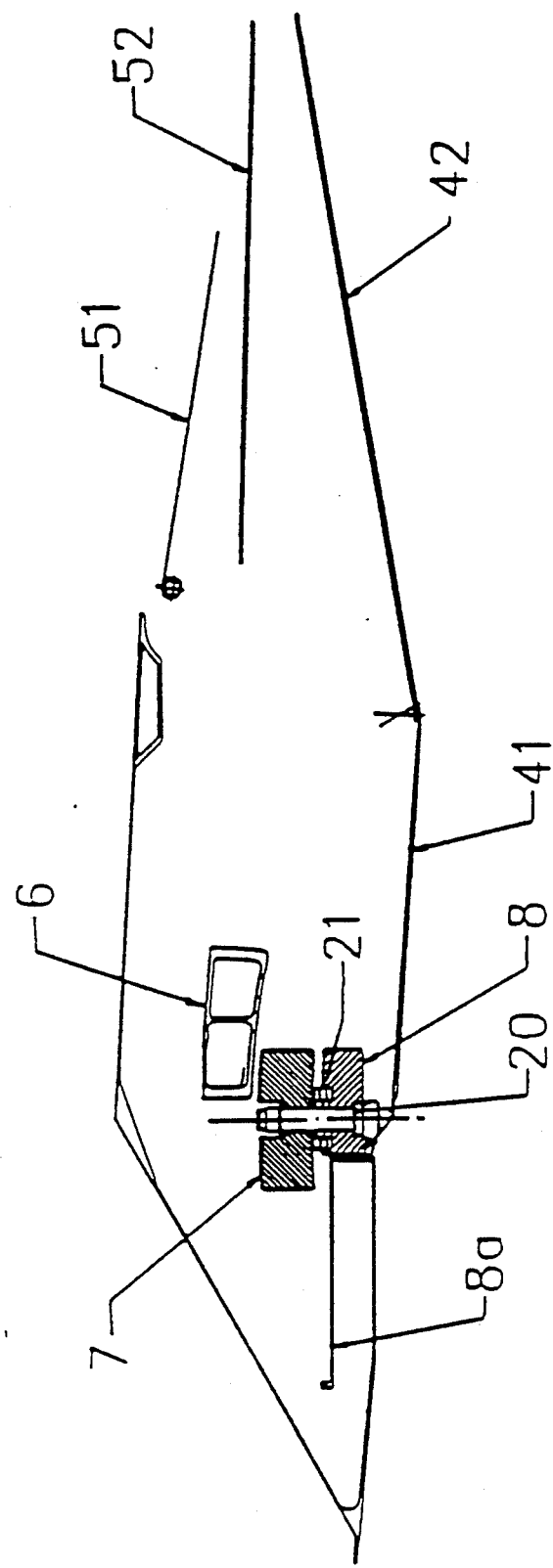
FIG. 8 is a longitudinal cross-section of the exhaust nozzle, along line D—D of FIG. 2, with the exhaust nozzle in the open position and without vectoring of the thrust.
Figure 9:
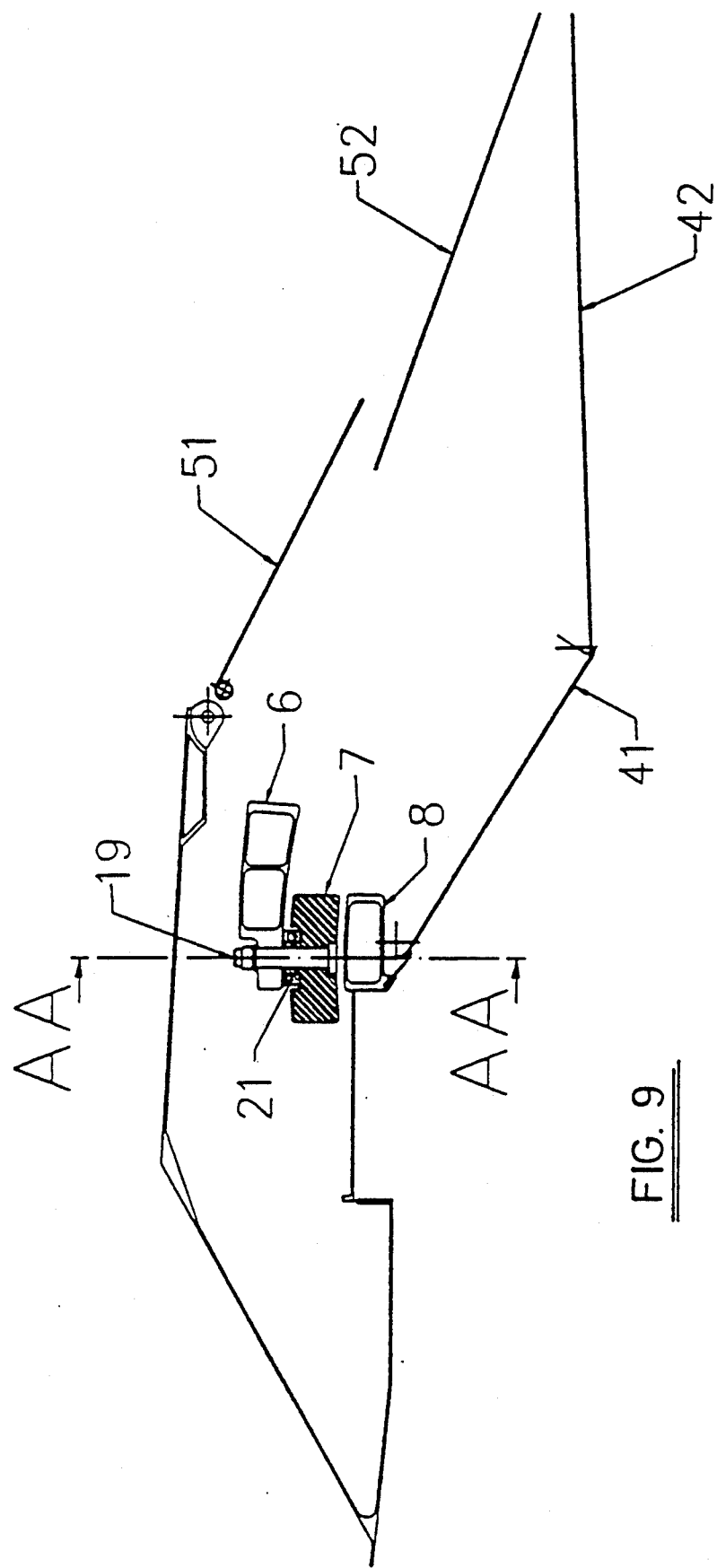
FIG. 9 is a longitudinal cross-section of the exhaust nozzle, along line E—E of FIG. 2, with the exhaust nozzle in the closed position and without vectoring of the thrust.

With the aim of reducing the clearances between the rings 6, 7 and 8 and minimizing friction therebetween during their relative rotation, some axial thrust bearings 21, shown in FIGS. 8 and 9, are arranged concentrically with the shafts 19 and 20.

Figure 7:
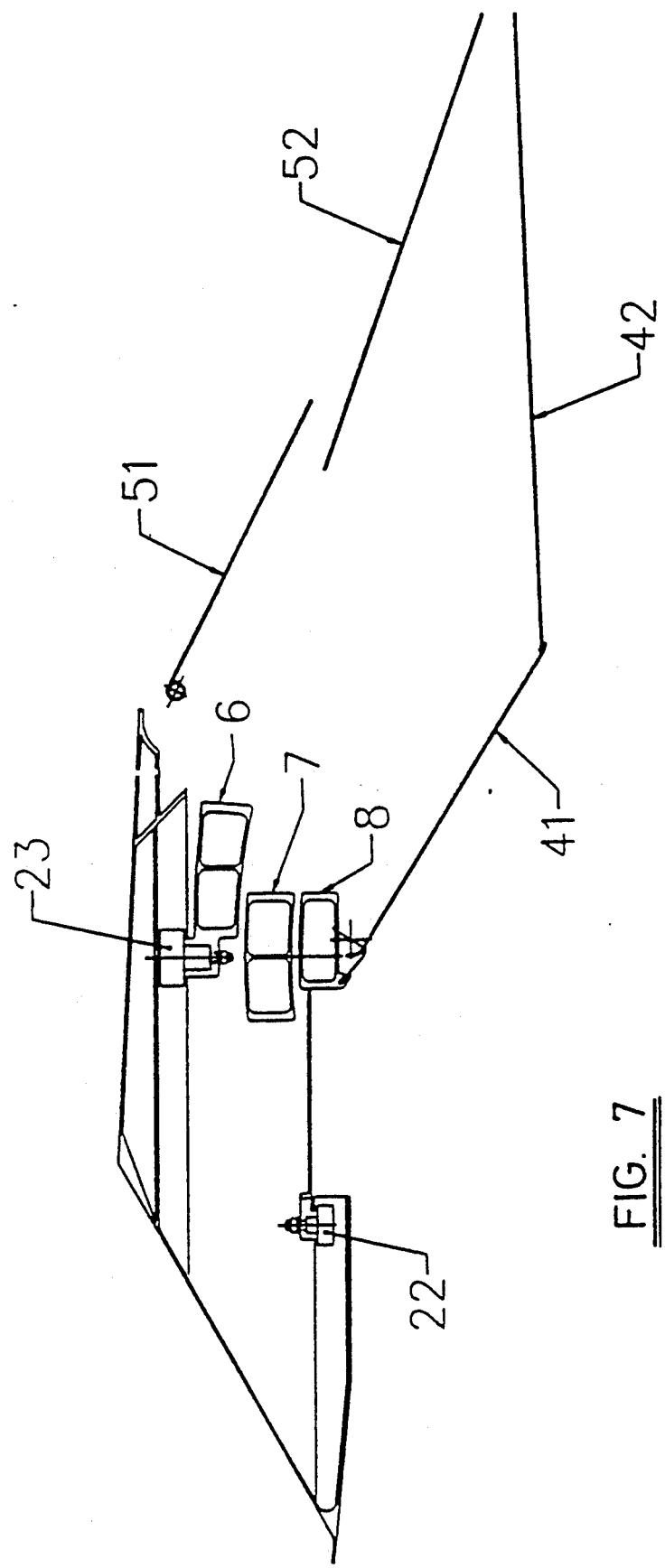
FIG. 7 is a longitudinal cross-section of the exhaust nozzle, along line C—C of FIG. 2, with the exhaust nozzle in the closed position and without vectoring of the thrust.

As can be seen in FIGS. 3 to 16, the inner ring 8 has a cylindrical extension 8A, by means of which the post-combustor is sealed during adjustment of the throat area 15 of the exhaust nozzle. The central axis of this cylindrical extension must always be located along the centerline of the turbine and has a minimum of three rollers 22, as shown in FIG. 7, located outside the plane of the spherical joint. The rollers move solely in the axial direction inside guides fixed to the structure of the turbine, in order to define the guide device for the inner ring 8.

For its part, the outer ring 6 is guided by a device consisting of a minimum of three rollers 23, shown in FIGS. 2, 7, 11, 13 and 19, which can move only in the axial direction inside guides fixed to the turbine structure, with a small clearance to allow rotation of outer ring 6 over any diameter.

The guides for the rings 6 and 8 absorb the effects of net shear that might appear during the vectoring of the thrust, caused by asymmetries of the loads.

The device described, and represented in FIGS. 2 to 10, allows the following movements by means of activating the linear actuators 9 in one direction or another:

a) axial movement of the set of rings 6, 7 and 8 together with the struts 12 and the petals 4, allowing variation of the throat area A8, shown at 15 in FIG. 3. The displacement of the rings 6, 7 and 8 by the action of the linear actuators 9, causes the radial displacement of the convergent master petals 4 via the linkage 10. Due to the turbine fixed structure and by the connecting rod 16, the convergent master petals 4 open or close in the radial direction, defining with the struts 12 the position of the divergent master petals 5. In this case, the three linear actuators 9 will always have the same length.

b) Each of the actuators 9 can be lengthened or shortened in such a way that the outer ring 6 moves on a spherical surface, with its centerpoint along the turbine centerline. The ring 8 remains fixed in an axial position and thereby achieves via the same mechanisms, the vectoring of the thrust in any direction around the centerline of the turbine. In the operation indicated the struts 12, which are joined via a cylindrical linkage to the outer ring 6, rotate with ring 6 and force the divergent master petals 5 to move in the radial direction, this movement being indicated with an arrow R in FIGS. 35 and 37, and in the circumferential direction, the movement shown with the arrow T in the same FIGS. 35 and 37, thereby allowing the vectoring of the thrust to be achieved in the direction indicated by arrow B.

The radial and circumferential movements of the divergent master petal 5 can be achieved by linking that petal to the convergent petal 4 via a spherical linkage, as described in British Patent No. 2230239A. In accordance with the present invention, the same effect can be achieved by transversely subdividing each master petal 5 into two segments, referenced with numbers 5a and 5b, and joined together by means of a cylindrical linkage arranged in the perpendicular direction to the base of the petal, as can be seen better in FIGS. 26 and 27. The segment 5a is joined via a cylindrical linkage 25 to the master petal 4, see FIGS. 3, 26 and 27. With this solution the problem of sealing the throat area 15 is solved in the simplest way, since during the vectoring of the thrust, both segments 5a and 5b move in a radial direction, but segment 5a is prevented from moving in the circumferential direction, with only element 5b being able to move in that direction.

c) The outer ring 6 can be divided diametrically into two half-rings, shown by numbers 6a and 6b, connected together by means of the same elements that shape the cylindrical linkages 19, as can be seen in FIG. 25. The linear actuators 9 that connect these cylindrical linkages 19 will remain fixed in length. Those that are secured to the mid-point of the half-rings 6a and 6b being shortened or lengthened by the same amount in order to vary the outlet area A9 of the exhaust nozzle for a given throat area 15, since the struts 12 open or close the divergent master petals 5.

The three possibilities of movement mentioned above can be carried out simultaneously with suitable adjustment of the run of the linear actuators 9.

Figure 4:
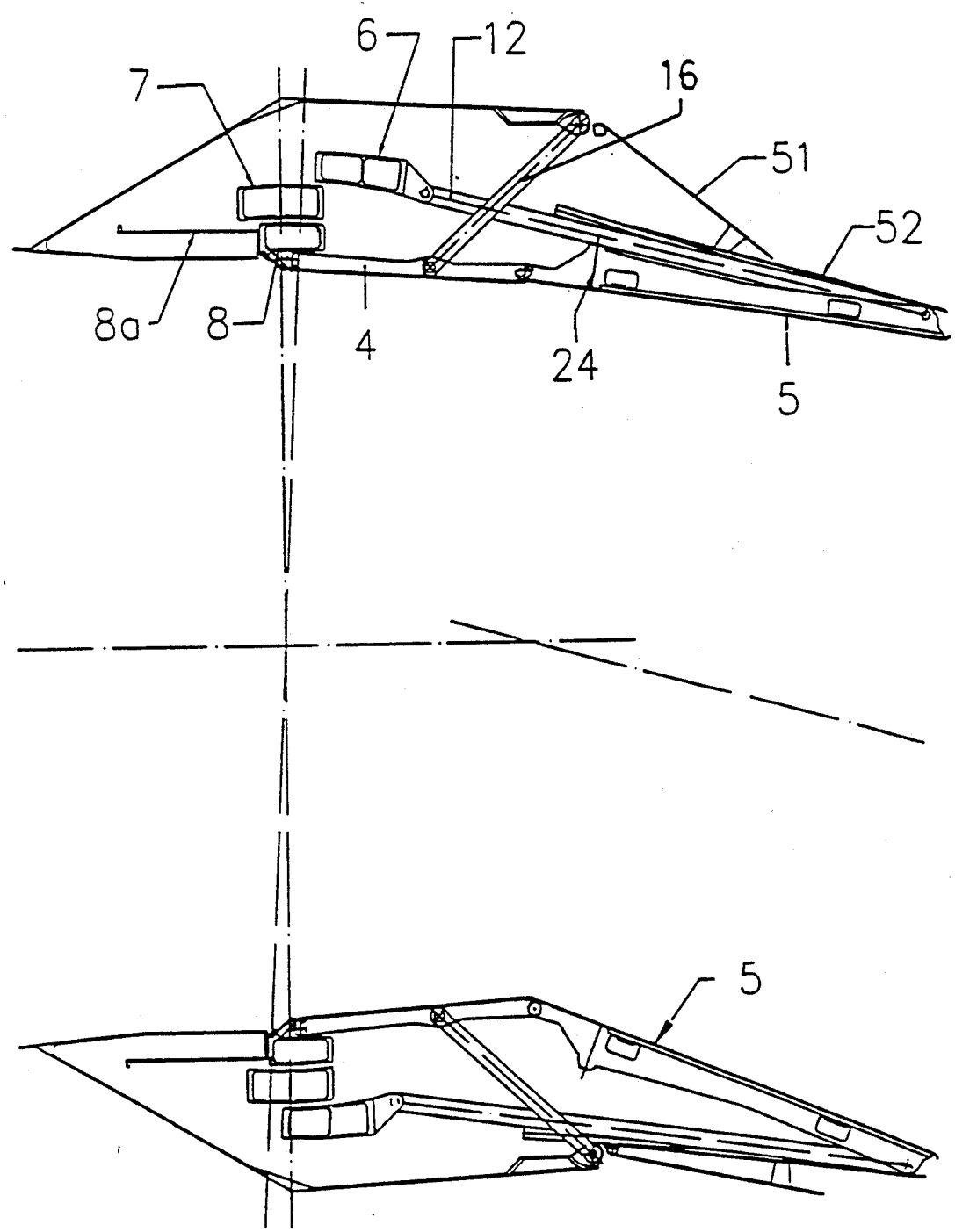
FIG. 4 is a longitudinal cross-section of the exhaust nozzle along the line B—B of FIG. 2, showing the exhaust nozzle in its open position and with vectoring of the thrust.
Figure 5:
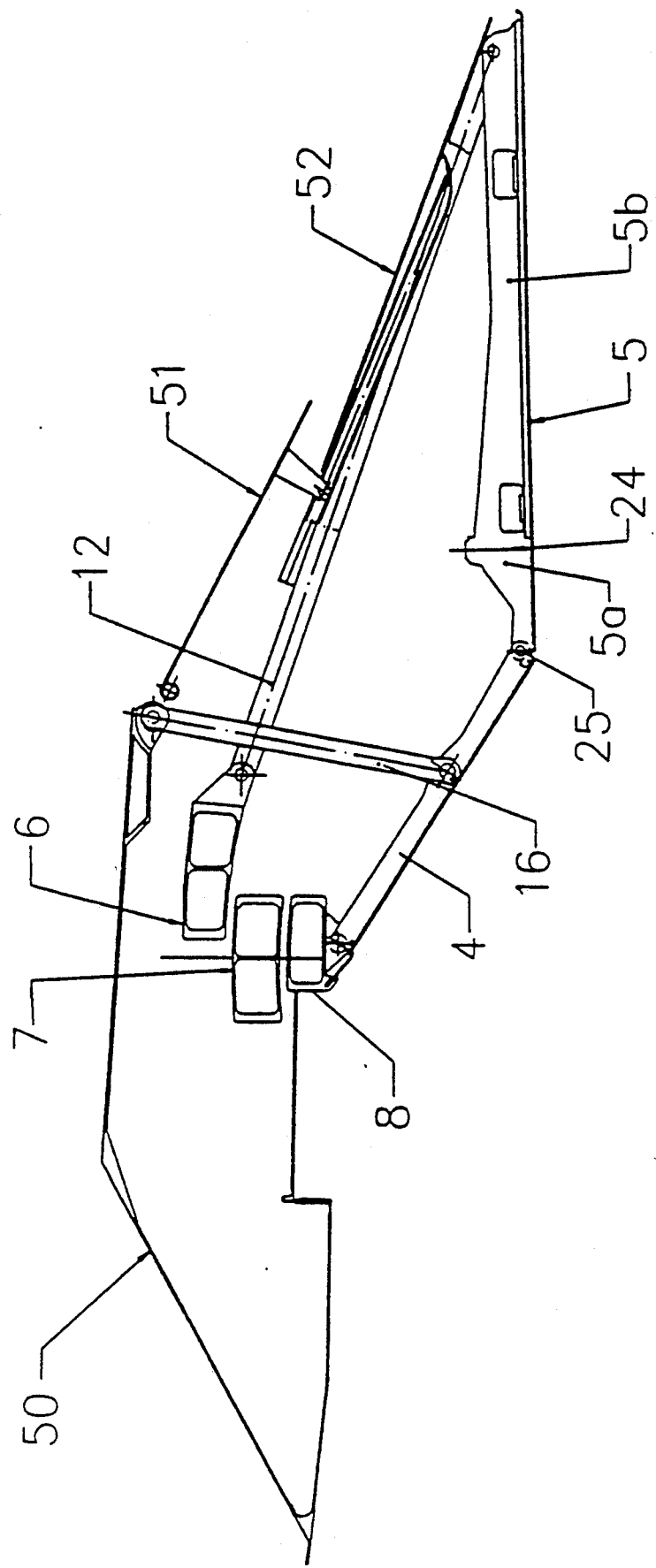
FIG. 5 is a cross-section similar to FIG. 3, with the exhaust nozzle in the closed position and without vectoring of the thrust.
Figure 6:
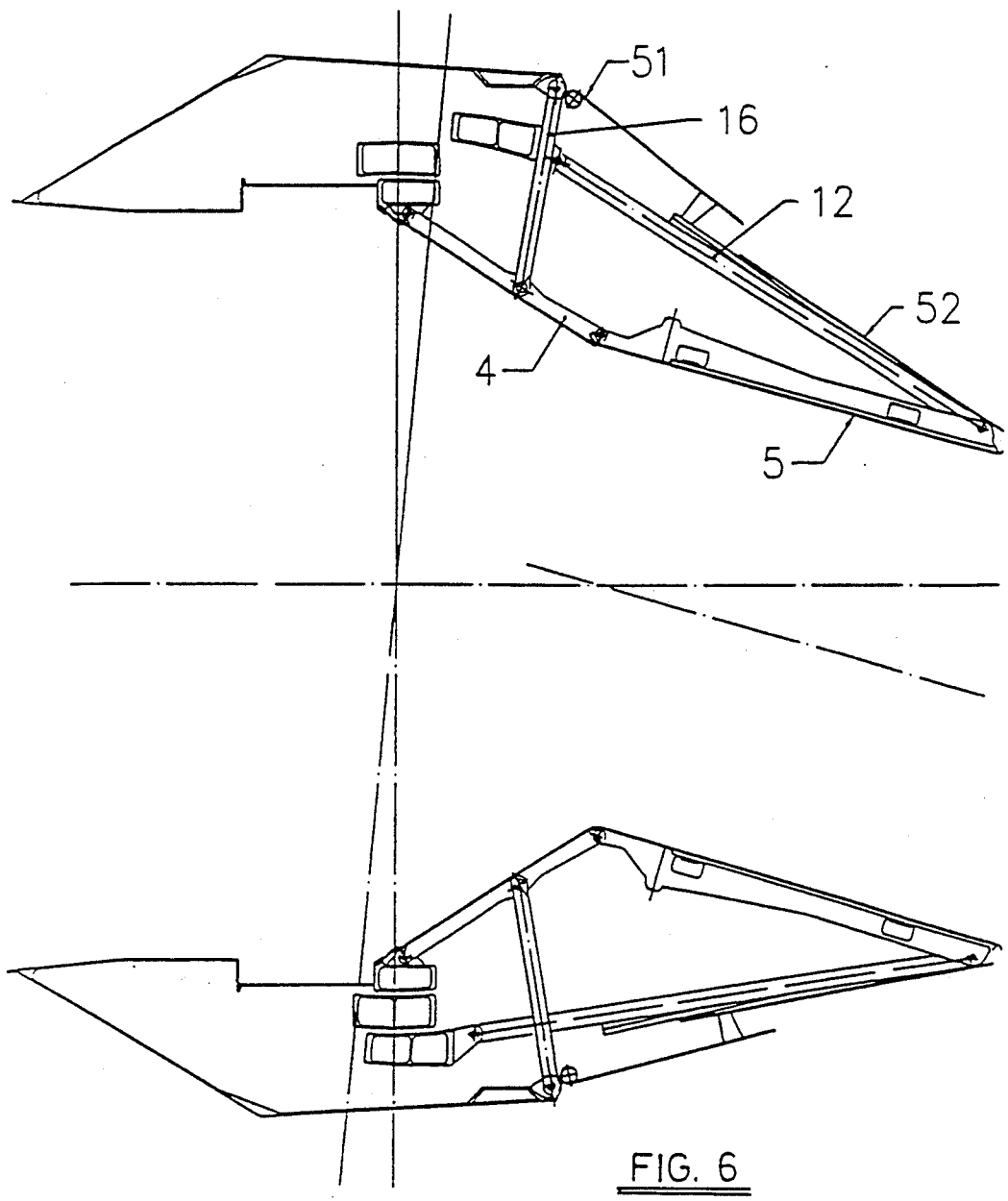
FIG. 6 is a cross-section similar to FIG. 4, with the exhaust nozzle in the closed position and with vectoring of the thrust.

FIG. 3 shows the exhaust nozzle in the open position and without vectoring of the thrust, while FIG. 4 shows the same longitudinal cross-section of the exhaust nozzle in the open position, but with vectoring of the thrust. FIG. 5 is a cross-section coinciding with FIG. 3, showing the exhaust nozzle in the closed position and without vectoring of the thrust, while FIG. 6, which corresponds to the same cross-section of the exhaust nozzle, shows it in the closed position but with vectoring of the thrust. These figures show the relative positions of the different components as the exhaust nozzle goes from the open to the closed position, with or without vectoring of the thrust.

FIG. 7, which shows the exhaust nozzle in the position coinciding with that represented in FIG. 5, shows the bearings or rollers 22 and 23 that can be displaced on longitudinal guides in order to axially displace the rings 6, 7 and 8. These bearings or rollers can form part of the rings and the guides, throughout the length that they have to slide through, forming part of the turbine-fixed structure or, on the other hand, the guides can form part of the rings and the rollers 22 and 23 can be mounted on the turbine-fixed structure.

FIG. 8 represents one of the cylindrical linkages 20 that connects the intermediate ring 7 to the inner ring 8.

FIG. 9, which shows a position coincident with that of FIG. 5, represents one of the cylindrical linkages 19 connecting the outer ring 6 to the intermediate ring 7. FIG. 10, in which the nozzle also occupies a position coincident with that of FIG. 5, the connection 11 between one of the actuators 9 and the outer ring 6 is shown.

FIGS. 11 to 16 show a variation in the design in which the mechanism for modifying the throat area 15 consists of a roller 26 and a cam 27 that support each other. In the design shown in FIGS. 12 to 16 the roller 26 is mounted on the convergent master petal 4 so that it can freely rotate while the cam 27 is integral with the fixed structure of the turbine.

As an alternative, the roller 26 could be mounted on the turbine fixed structure, with the cam 27 formed in the facing surface of the convergent master petal 4. Otherwise, the arrangement and operation of the exhaust nozzle is the same as that described with reference to FIGS. 1 to 10.

Figure 11:
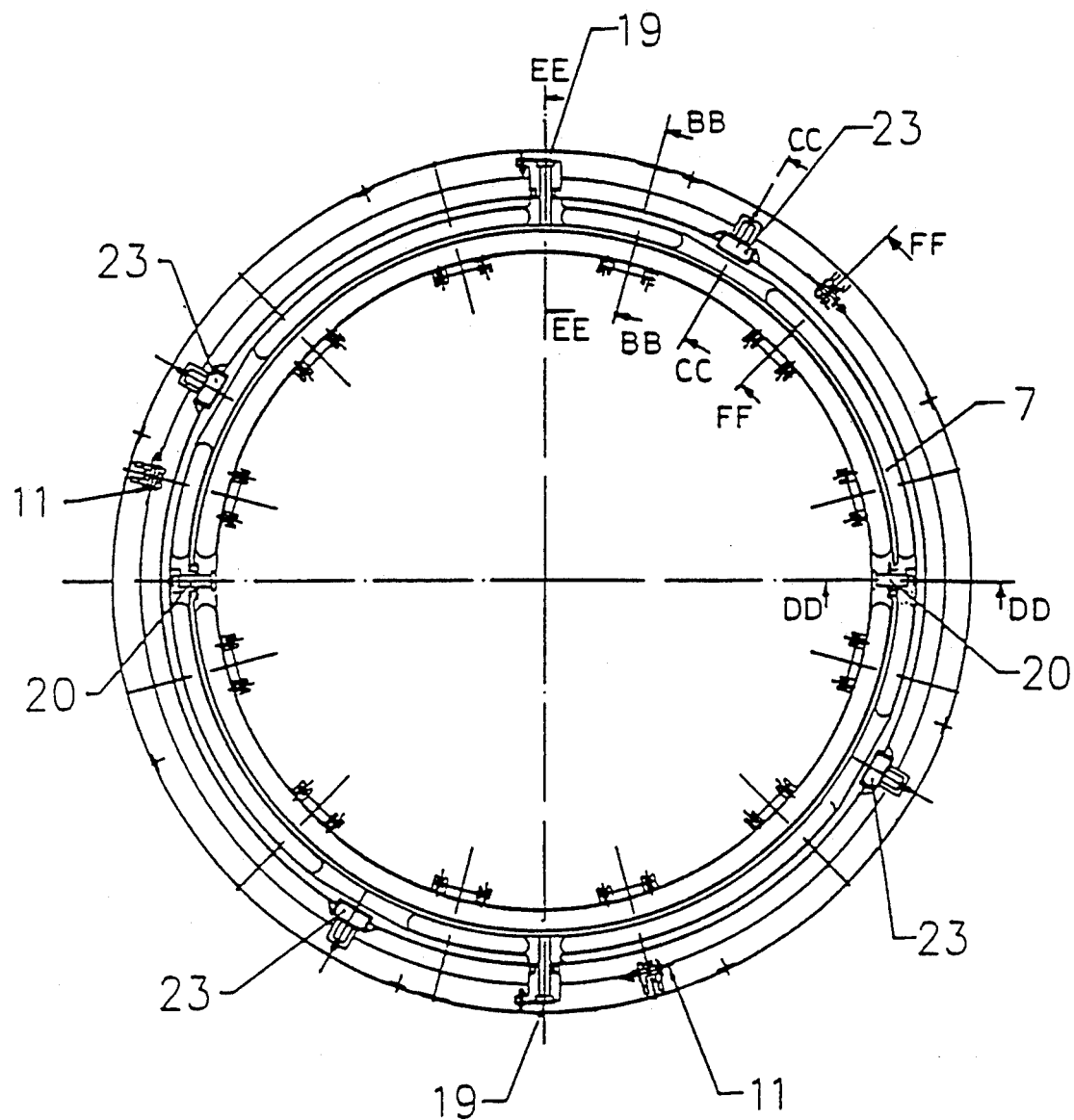
FIG. 11 is a longitudinal cross-section of the exhaust nozzle, taken along line A—A of FIG. 15, showing an alternative form of carrying out the invention with respect to FIG. 2.
Figure 12:
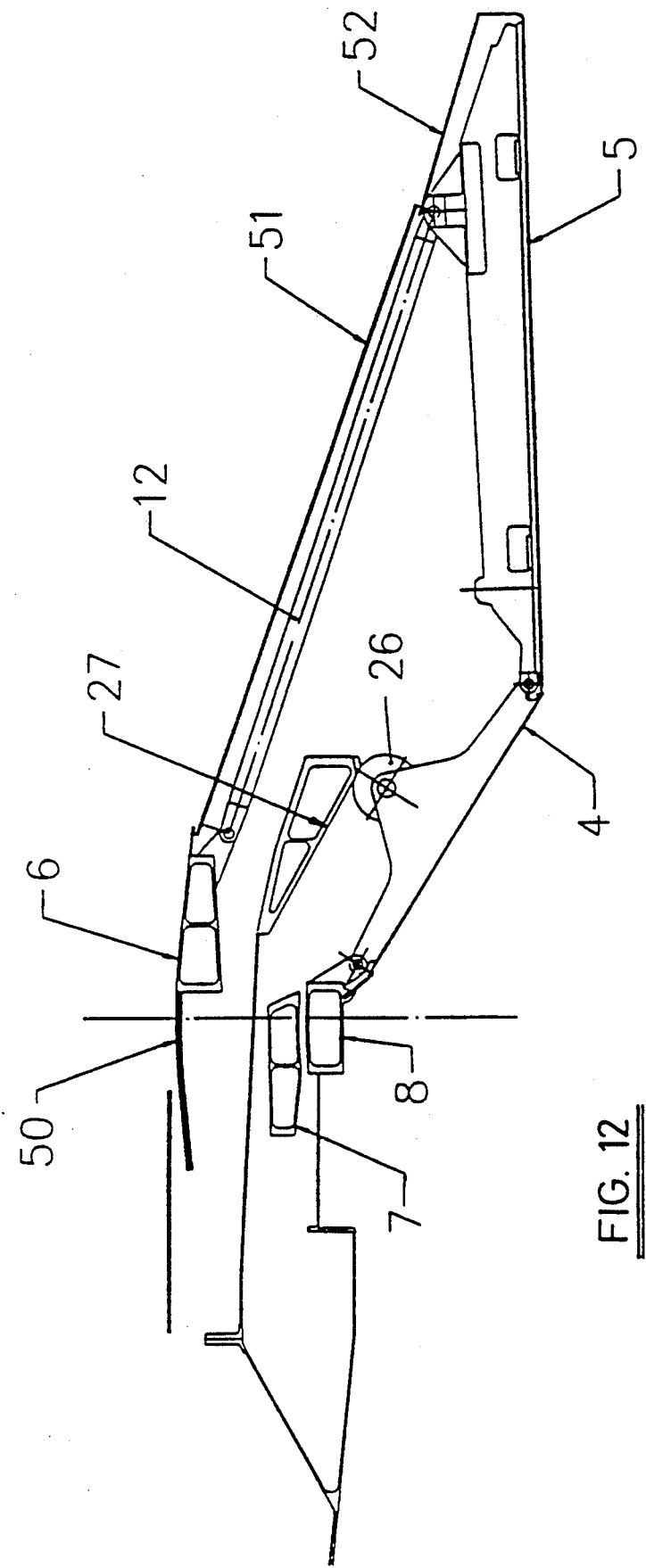
FIG. 12 is a longitudinal cross-section of the exhaust nozzle, along line BB—BB of FIG. 11, with the exhaust nozzle in the closed position and without vectoring of the thrust.
Figure 13:
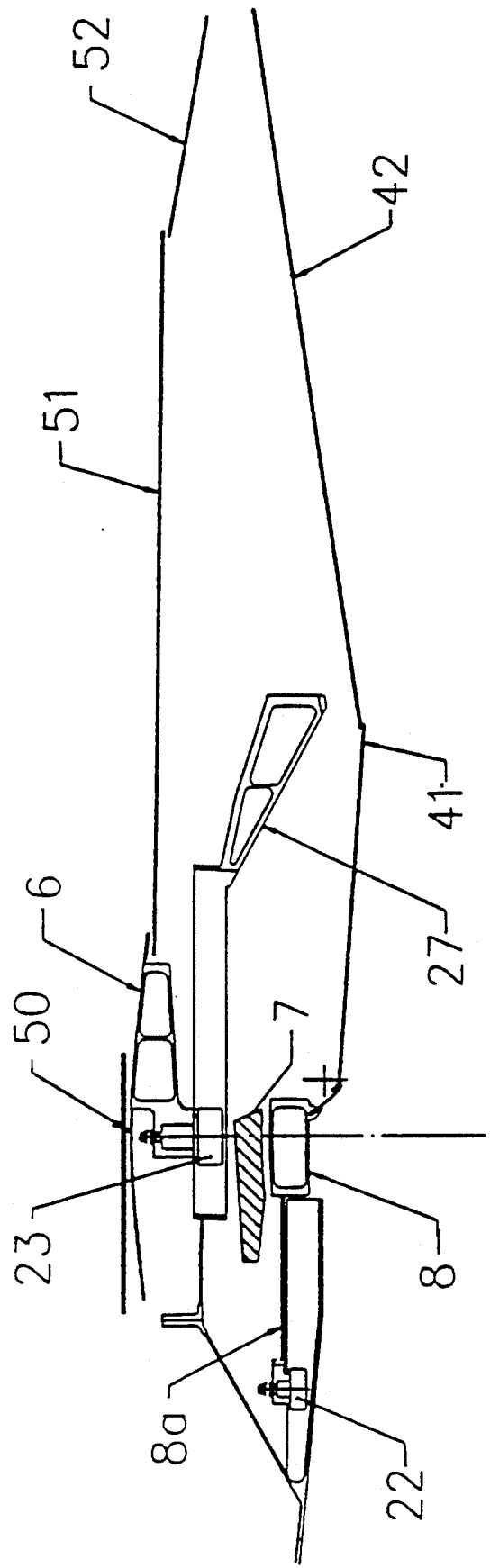
FIG. 13 is a longitudinal cross-section of the exhaust nozzle, along line CC—CC of FIG. 11, with the exhaust nozzle in the open position and without vectoring of the thrust.
Figure 14:
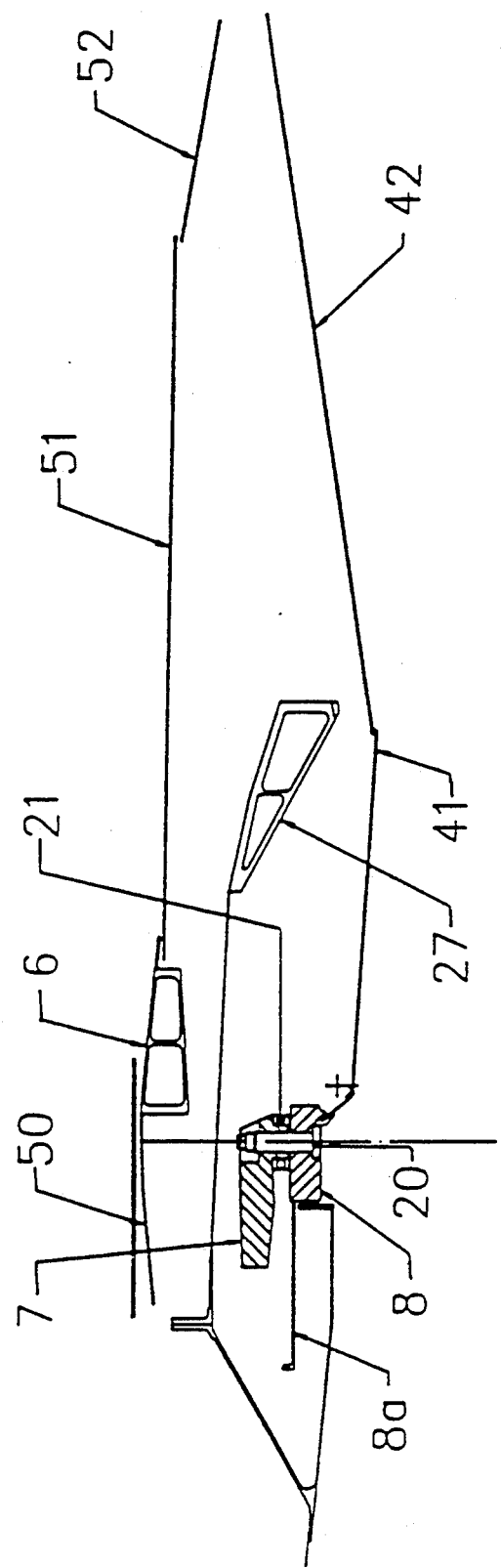
FIG. 14 is a longitudinal cross-section of the exhaust nozzle, along line DD—DD of FIG. 11, with the exhaust nozzle in the open position and without vectoring of the thrust.
Figure 15:
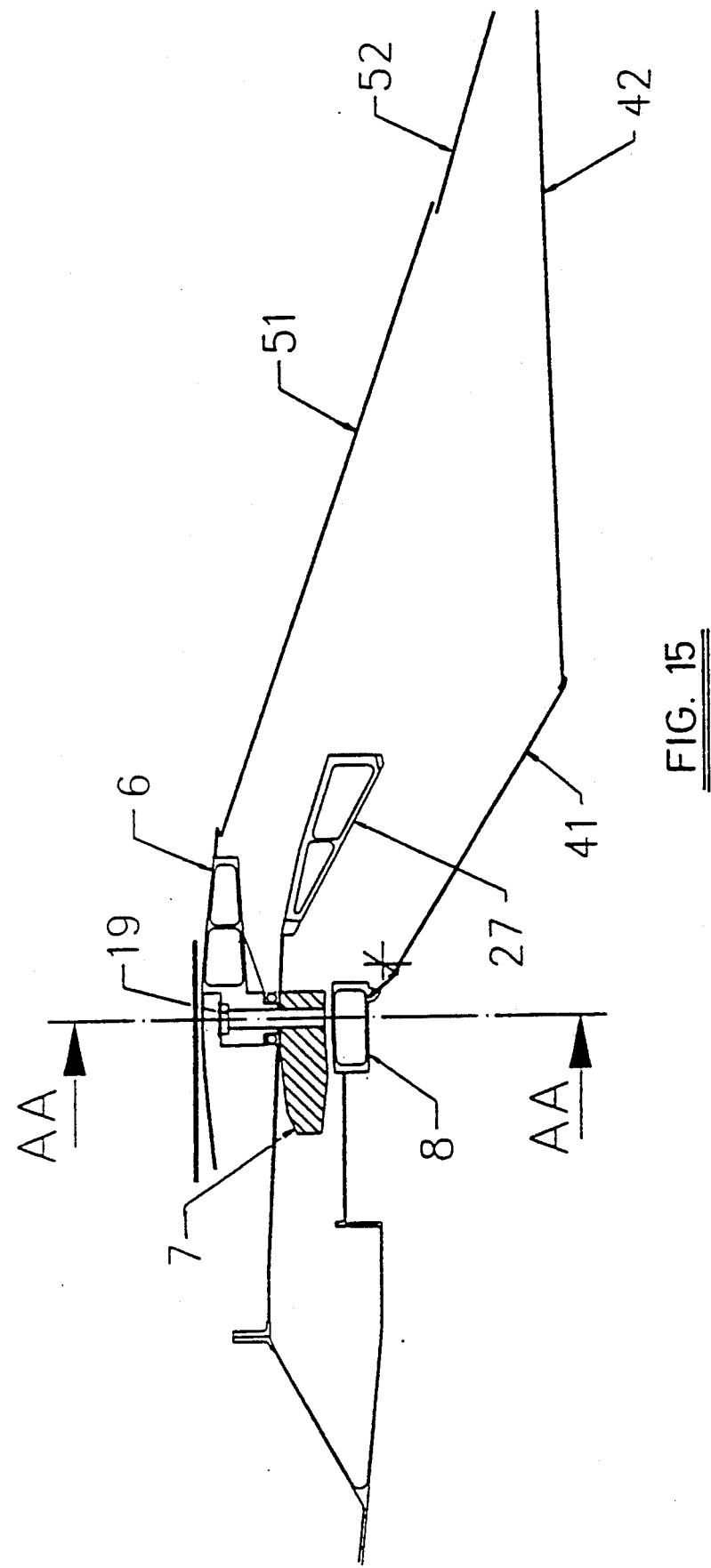
FIG. 15 is a longitudinal cross-section of the exhaust nozzle, along line EE—EE of FIG. 11, with the exhaust nozzle in the closed position and without vectoring of the thrust.
Figure 16:
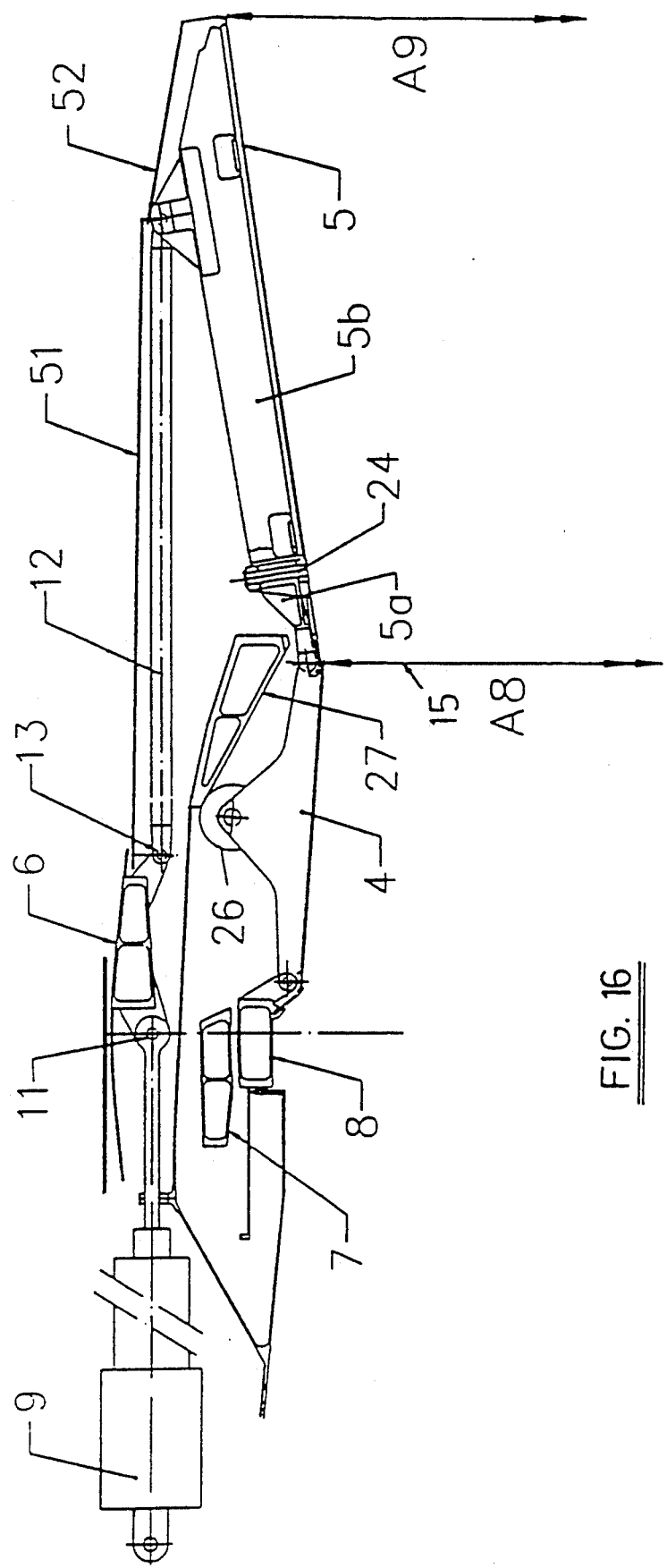
FIG. 16 is a longitudinal cross-section of the exhaust nozzle, along line FF—FF of FIG. 11, with the exhaust nozzle in the open position and without vectoring of the thrust.

FIG. 12 illustrates the exhaust nozzle in the closed position, without vectoring of the thrust, showing the connection between the struts 12 and the outer ring 6, on one hand, and with the divergent master petal 5, on the other. FIG. 15 represents a position of the exhaust nozzle coincident with that of FIG. 12, showing one of the cylindrical linkages 19 joining the outer ring 6 to the intermediate ring 7, as shown in FIG. 11. FIGS. 13 and 14 show the exhaust nozzle in the open position and without vectoring of the thrust. FIG. 13 includes the rollers 22 and 23 that guide the axial displacement of the set of rings 6, 7, and 8, while FIG. 14 includes the cylindrical linkage 20 between the rings 7 and 8. FIG. 16 also shows the exhaust nozzle in the open position and without vectoring of the thrust, including the connection point between one of the actuators 9 and the outer ring.

Figure 17:
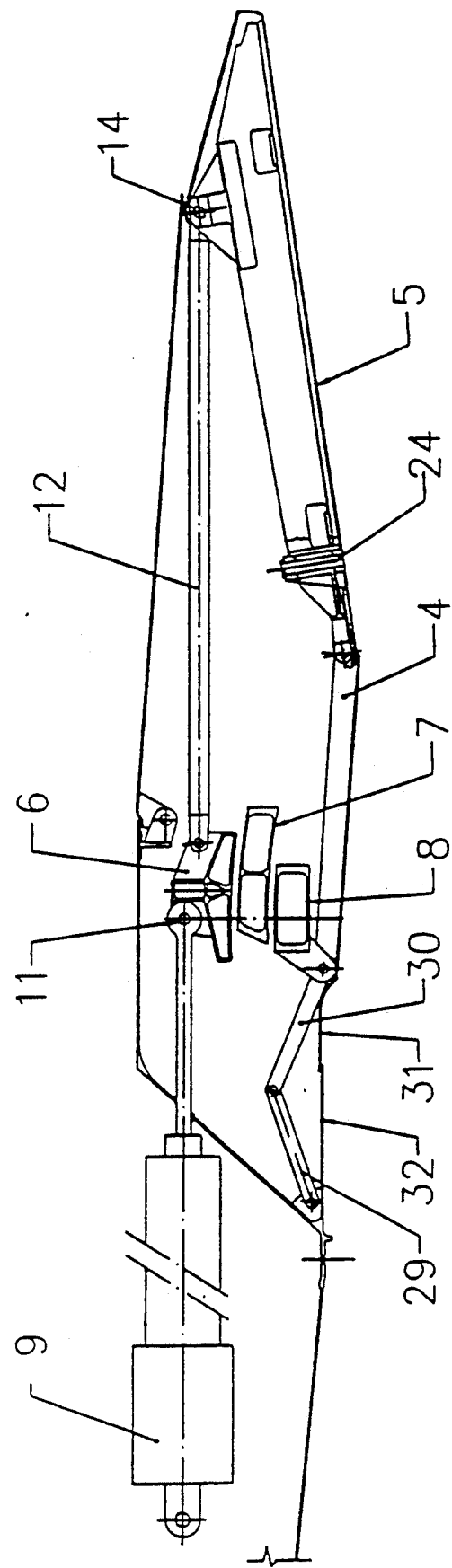
FIG. 17 is a longitudinal cross-section similar to FIG. 16, showing an alternative and with the exhaust nozzle in the open position and without vectoring of the thrust.
Figure 18:
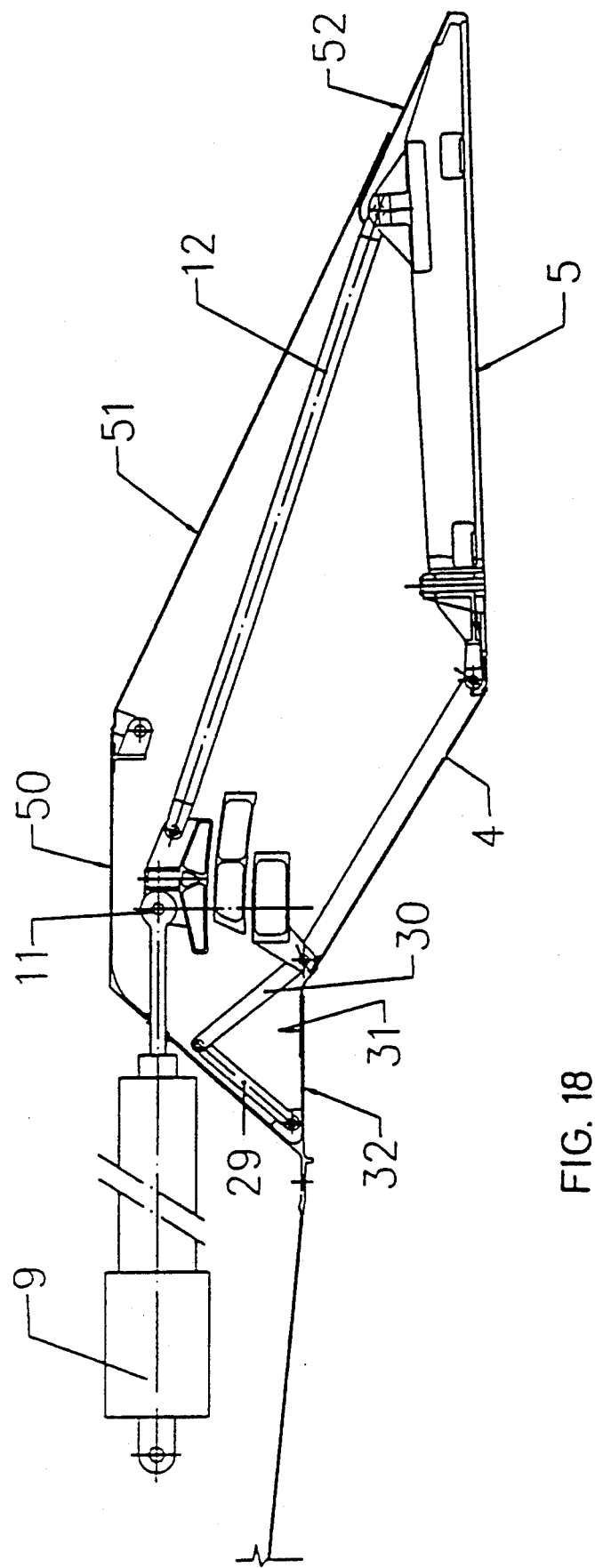
FIG. 18 is a view similar to FIG. 17, with the exhaust nozzle in the closed position and without vectoring of the thrust.
Figure 19:
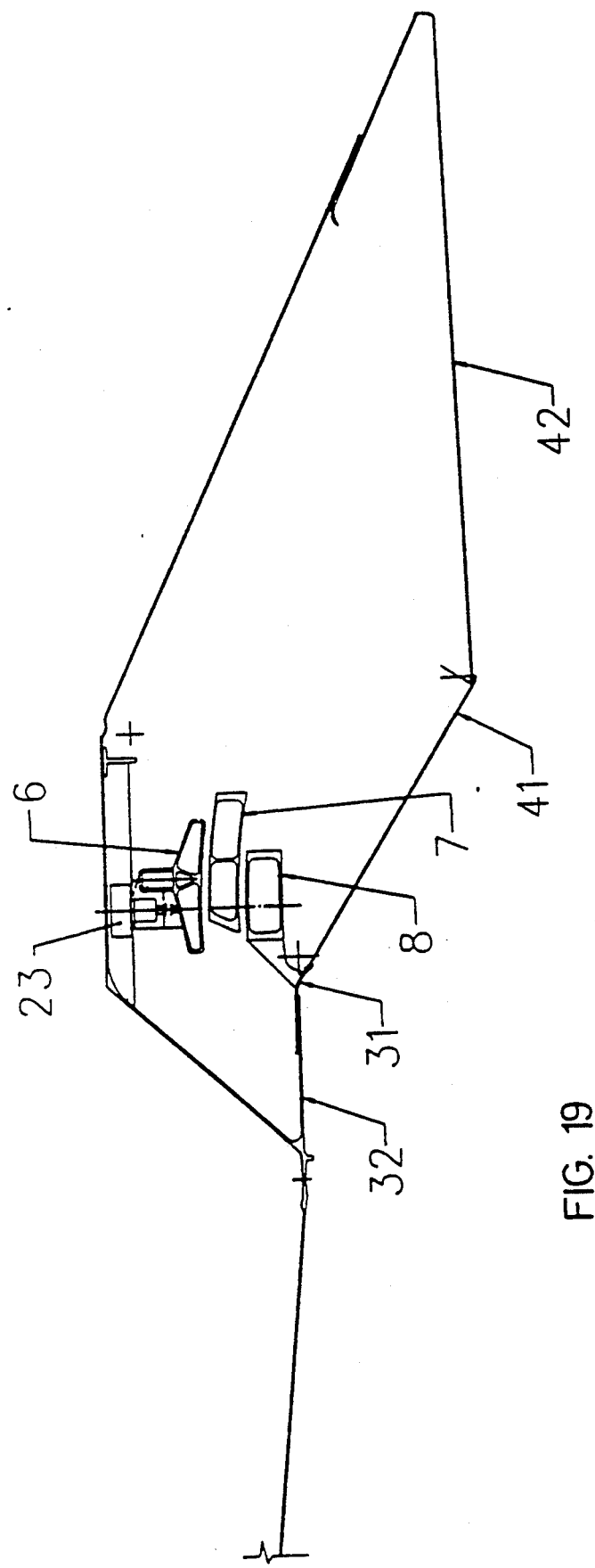
FIG. 19 is a longitudinal cross-section of the exhaust nozzle, along line CC—CC, showing the alternative of FIG. 17, with the exhaust nozzle in the closed position and without vectoring of the thrust.

FIGS. 17 and 19 show another system or mechanism for modifying the throat area 15, comprising a connecting rod 29 that is linked by its upstream end to the turbine fixed structure, while its downstream end is linked to an extension 30 of the convergent master petal 4. As it moves, the inner ring 8 pulls the cylindrical shell 31 which partially overlaps with the cylindrical shell 32 fixed to the turbine-fixed structure, in such a way that gas leaks are prevented, as shown in FIGS. 17, 18 and 19.

FIGS. 17 and 18 also correspond to longitudinal cross-sections of the exhaust nozzle in the open and closed positions, showing the connection point of one of the actuators 9 with the outer ring 6, while FIG. 19 corresponds to a longitudinal cross-section of the exhaust nozzle in the closed position, showing the roller 23 that will act as a guide for the axial displacement of the rings 6, 7 and 8.

Figure 20:
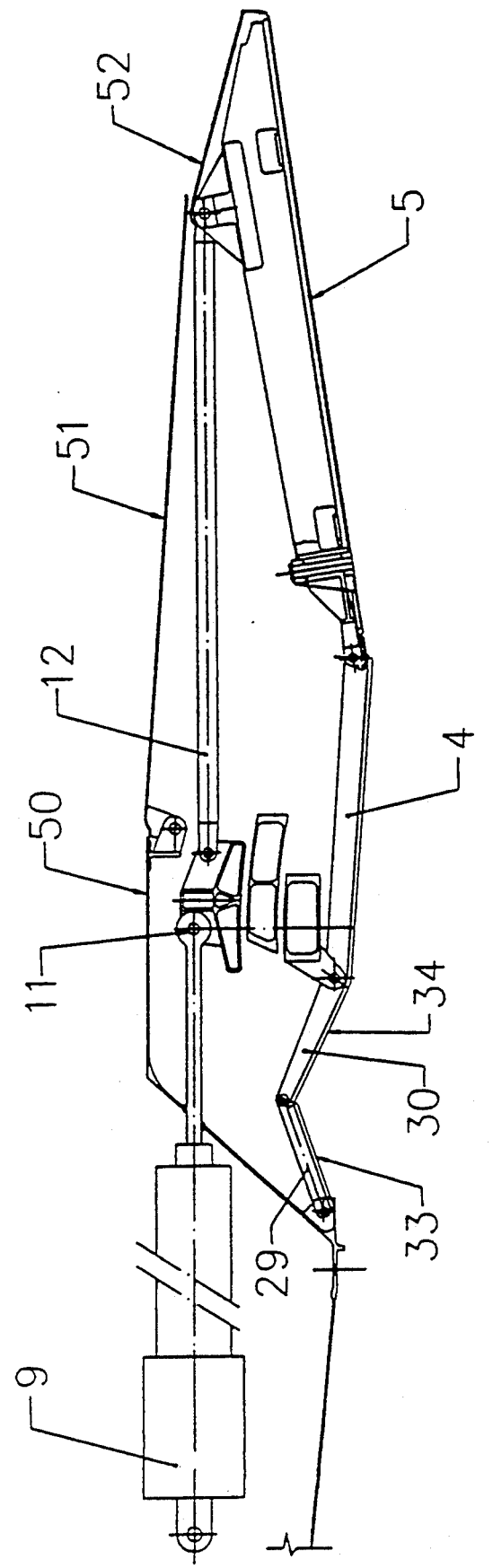
FIGS. 20 and 21 are cross-sections similar to FIG. 16, showing further alternative designs, with the exhaust nozzle in the open position and without vectoring of the thrust.

FIG. 20 represents a variation of FIGS. 17 to 19, in which both the extension 30 of the petal 4 and the connecting rod 29 make the master 33 and 34 and the interstices between them are sealed by means of partially overlapping slave petals 17 (not shown).

Figure 21:
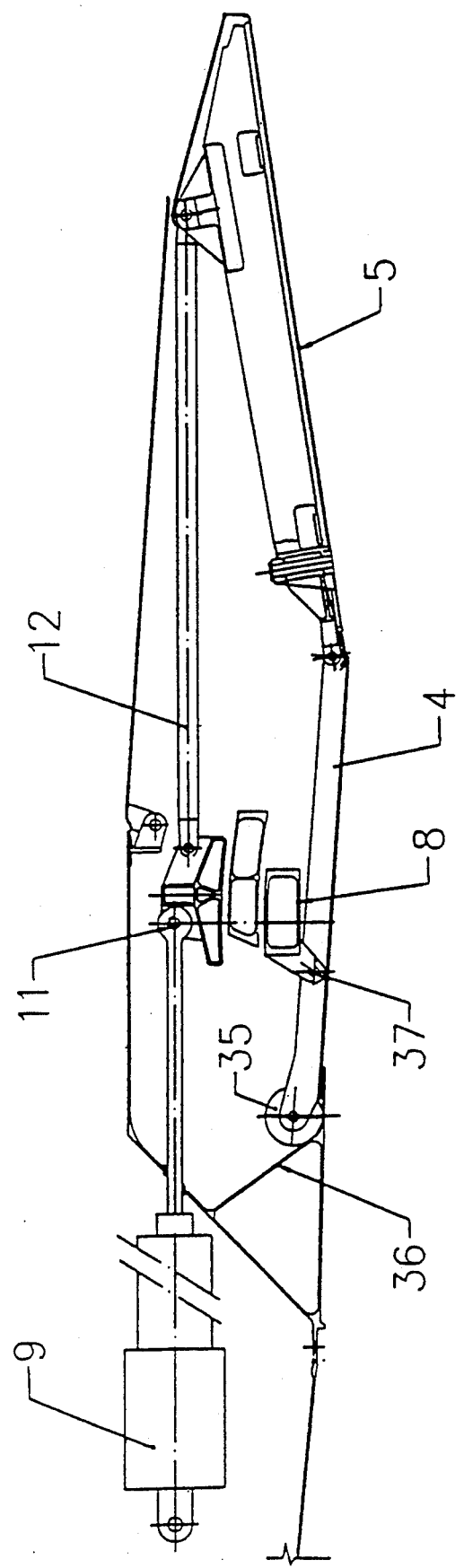
Figure 22:
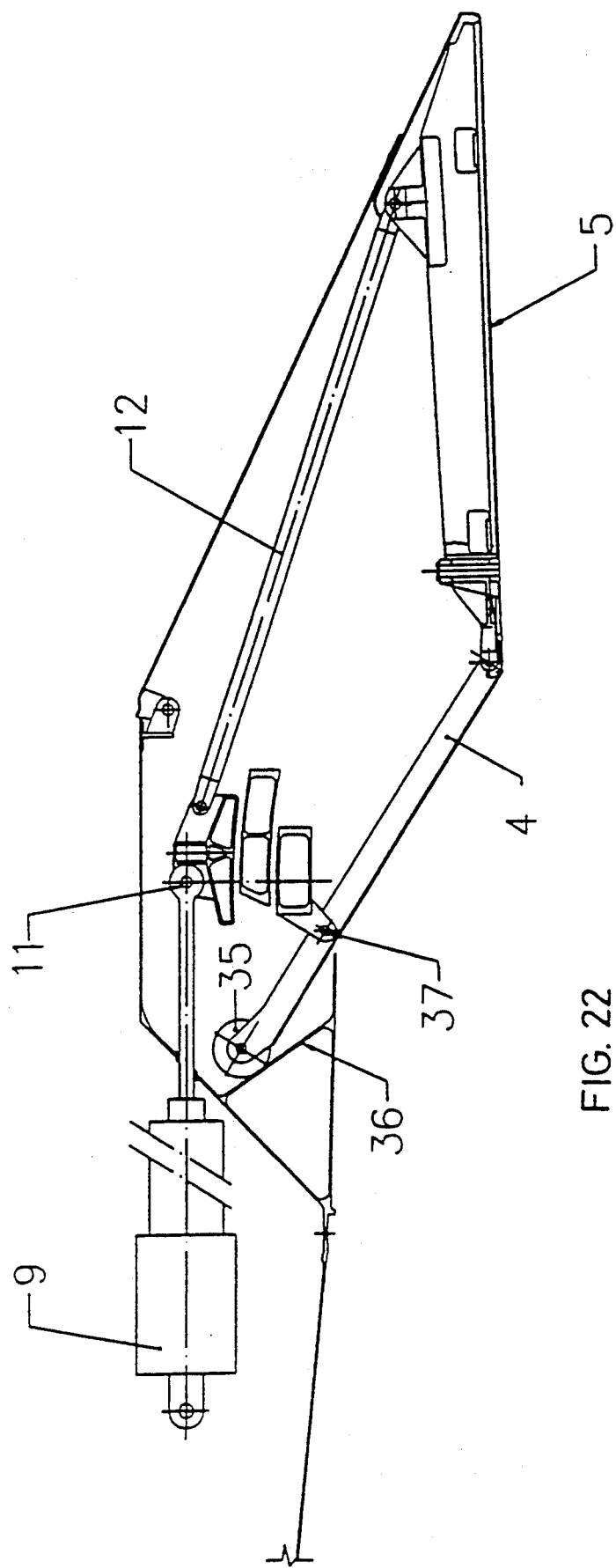
FIG. 22 is a similar view to FIG. 21 with the exhaust nozzle in the closed position and without vectoring of the thrust.

FIGS. 21 and 22 show another mechanism for modifying the throat area 15, consisting of a roller 35 linked to the upstream end of the convergent master petal 4. This roller is supported on a cam 36 formed in the turbine-fixed structure. The inner ring 8 connects to an intermediate point of the petal 4 via a cylindrical linkage 37. FIG. 21 shows the exhaust nozzle in the open position and without vectoring of the thrust, while FIG. 22 shows the exhaust nozzle in the closed position, also without vectoring of the thrust.

Figure 23:
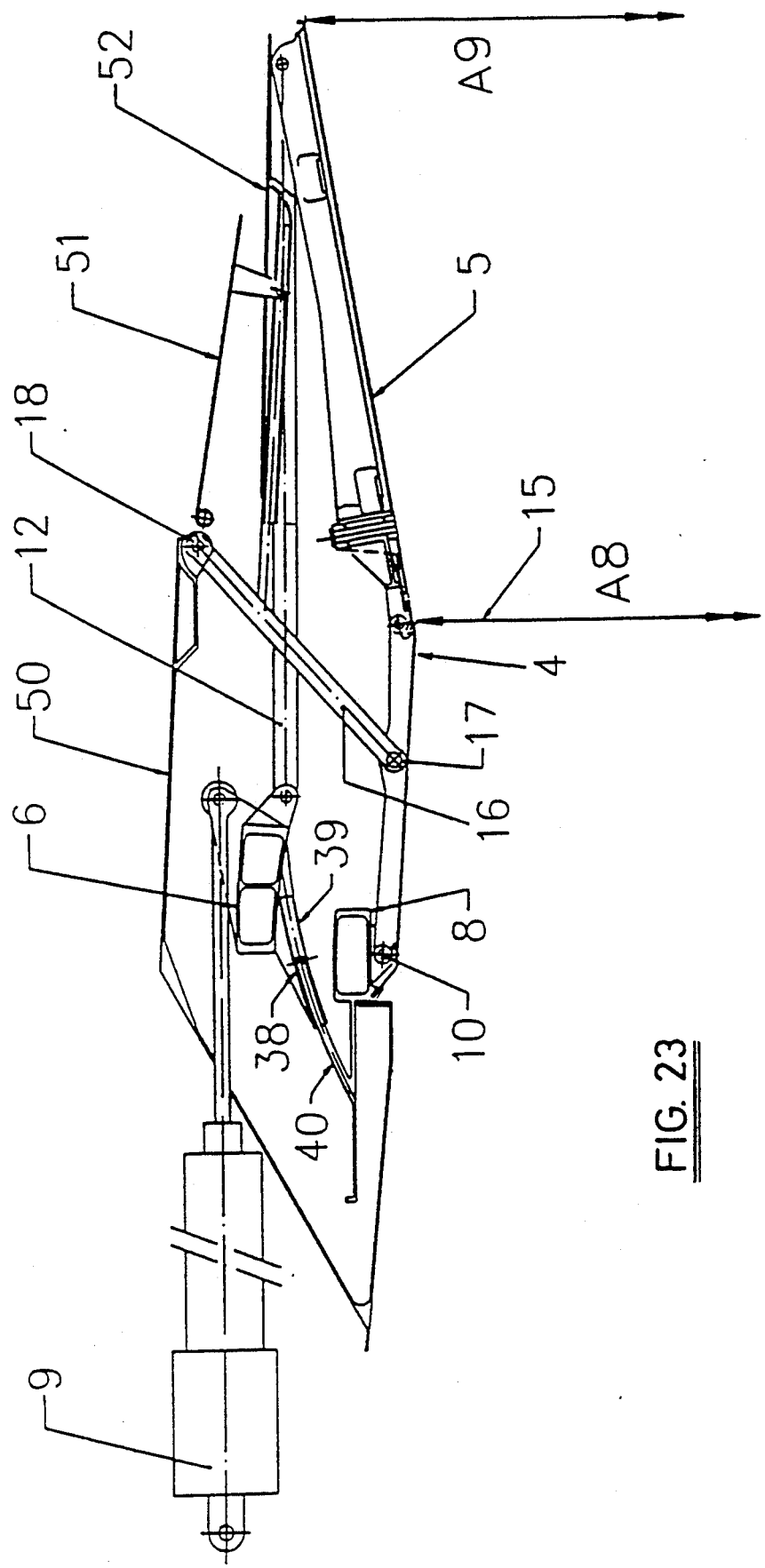
FIG. 23 is a longitudinal cross-section of the exhaust nozzle, along line F—F of FIG. 2, showing an alternative design of the rings, with the exhaust nozzle in the open position and without vectoring of the thrust.
Figure 24:
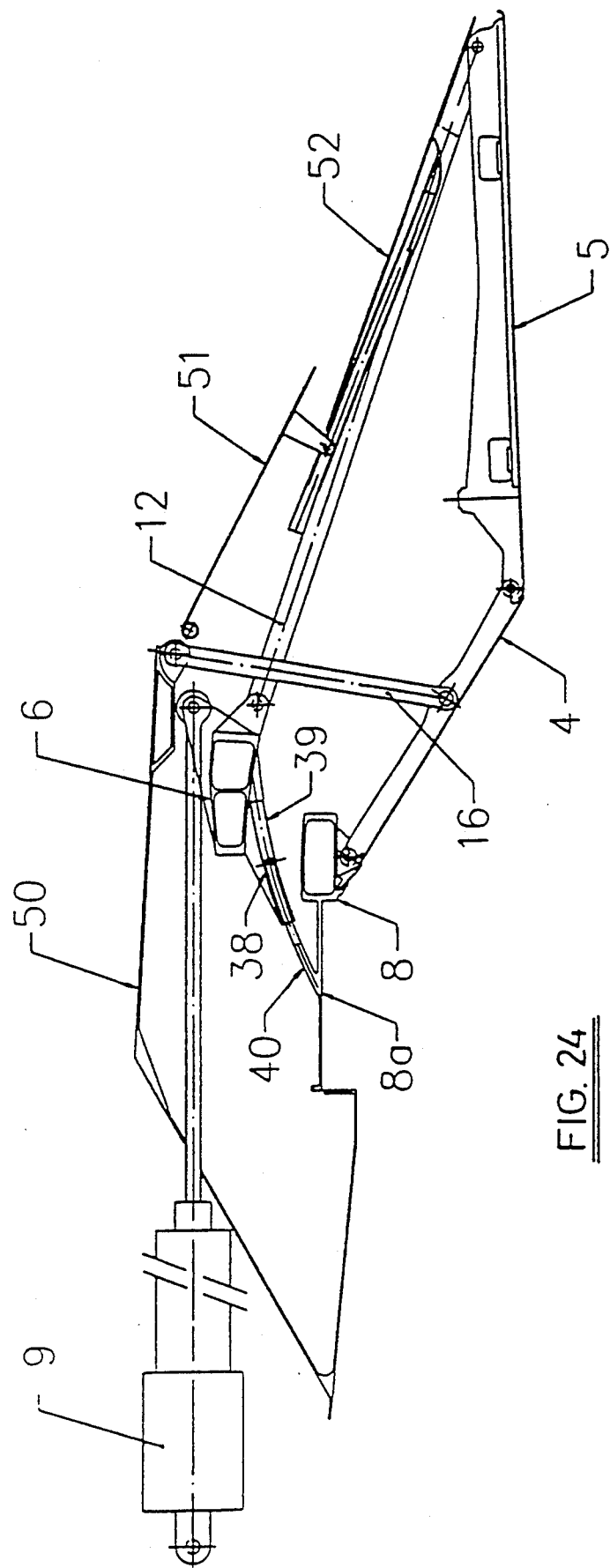
FIG. 24 is a similar cross-section to FIG. 23, with the exhaust nozzle in the closed position and without vectoring of the thrust.

In FIGS. 23 and 24, the intermediate ring 7 comprises three concentric spherical segments, 38, 39 and 40, which radially support each other. The outer segments 38 and 39 are linked to the outer ring 6, while the intermediate segment 40 is linked to the inner ring 8, the whole defining a spherical linkage with simple symmetry. The remaining elements of FIGS. 23 and 24 correspond to the cross-section and design of FIG. 10, with the exhaust nozzle opened and closed without vectoring of the thrust.

FIGS. 2 to 24 show the outer ring designed as a single body.

FIG. 25 shows in greater detail a transverse cross-section, similar to FIG. 11, with the two half-rings 6a and 6b making up the outer ring, connected by means of cylindrical linkages 19, an alternative that, as explained above, allows the outlet area A9 to be varied for a given throat area A8 or 15, by means of ovalizing area A9.

As stated above, FIGS. 26 and 27 show one of the divergent master petals 5 in plan and side elevation.

The sealing between the convergent master petals and between the divergent master petals is accomplished by means of corresponding convergent slave petals 41 and divergent slave petals 42, as shown and referenced in FIGS. 7, 8, 9, 13, 14, 15, and 19.

Figure 29:
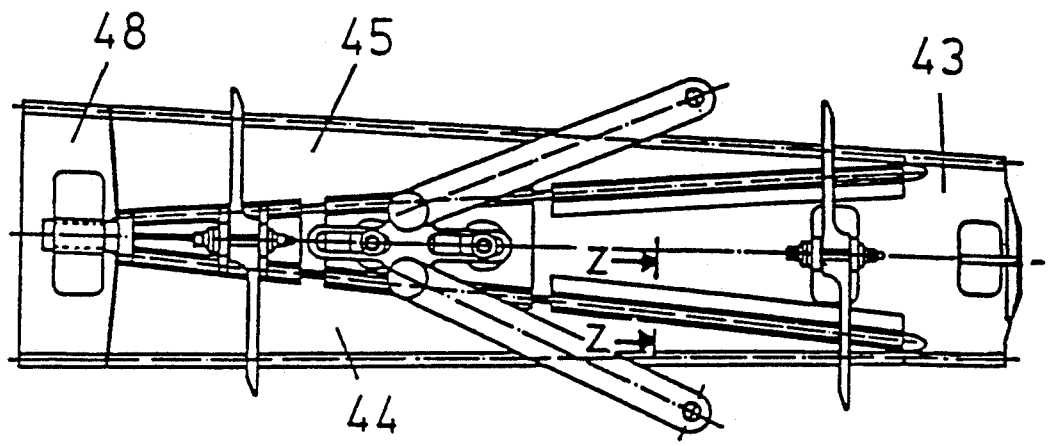
FIG. 29 is a plan view of the petal of FIG. 28.
Figure 30:
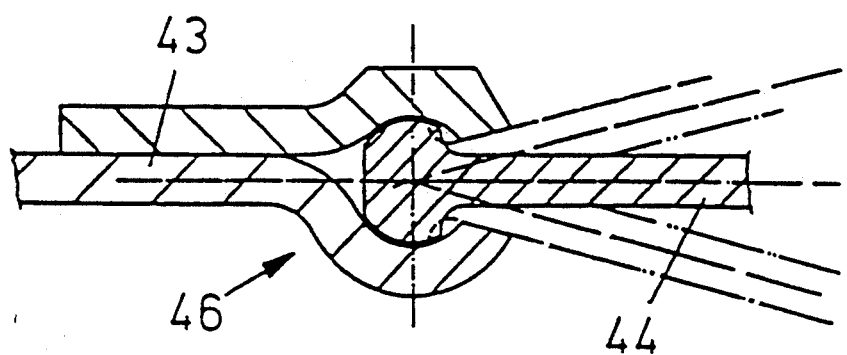
FIG. 30 is a cross-section, on a larger scale, along line Z—Z of FIG. 29.

In order to be adapted to the divergent master petals 5, consisting of segments 5a and 5b, and to resolve the problem of sealing the interstices existing between adjacent petals, a foldable plate provided with hinged linkages in each of its folds is provided. The freedom of rotation of the linkages is limited but sufficient so that the different components of that plate can adapt themselves to the configuration of maximum distortion of the geometry of that interstice. FIGS. 28 to 30 represent a possible design for divergent slave petals 42. Each petal consists of three approximately plane pieces, one central piece 43 having an approximately trapezoidal outline, and two similar side pieces 44 and 45, which are linked to the central piece via cylindrical bearings 46. The central piece 43 ends at its upstream side in a flare directly supported on the divergent master petals and has a lug 47 for connection to the slave petals of the convergent section. Via its downstream end central piece 43 is connected to a flat end piece 48 by means of a cylindrical bearing 49, parallel to the centerline of the turbine. With this arrangement, the asymmetric radial movement undergone by the divergent master petals during vectoring of the thrust will be absorbed by the independent rotation of the pieces 44 and 45.

Figure 31:
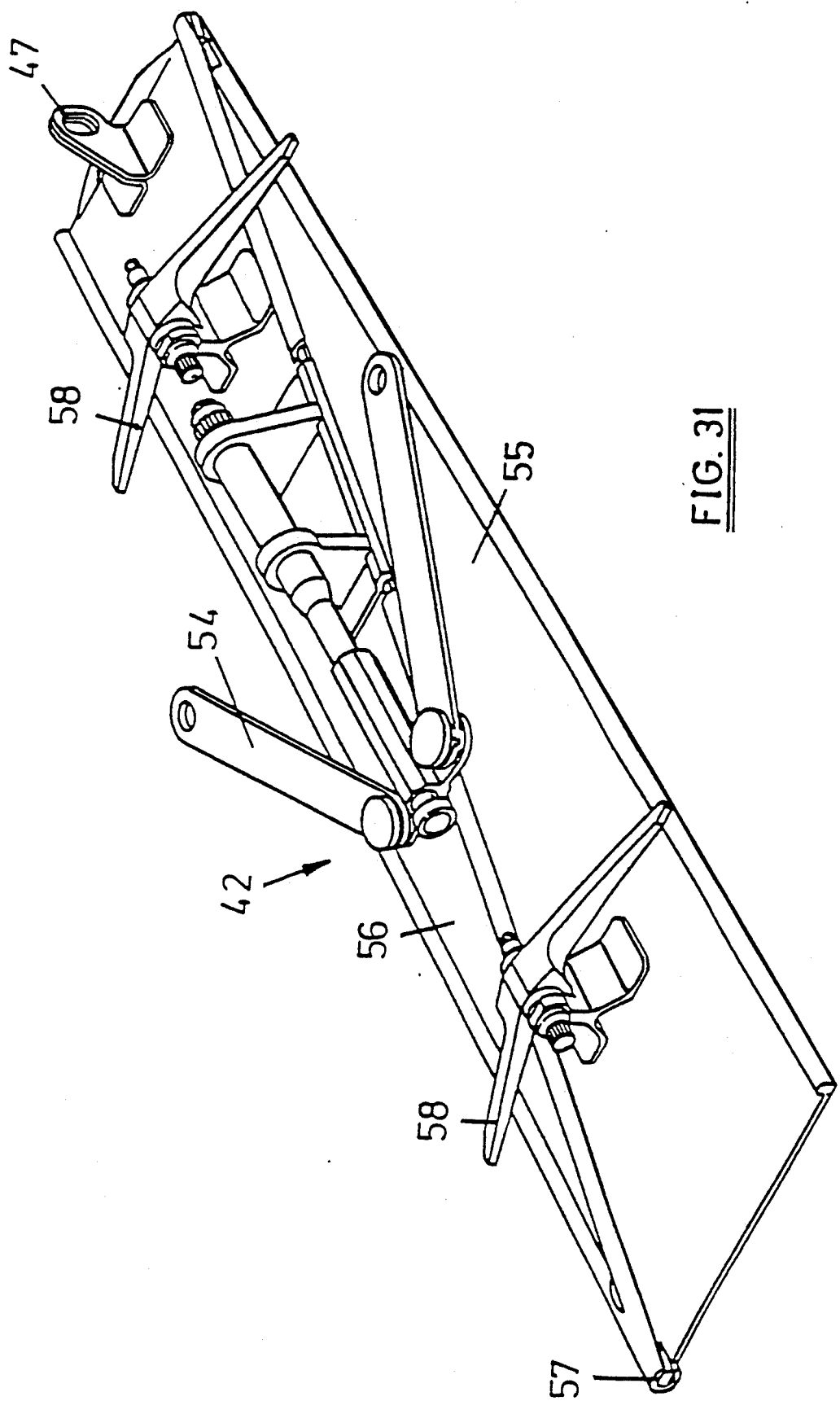
FIG. 31 shows in rear perspective a variation in the design of a divergent slave petal.
Figure 33:
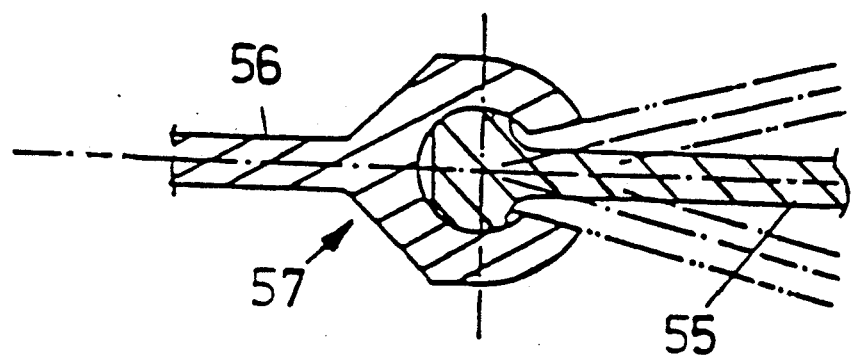
FIG. 33 is a cross-section, on a larger scale, along line ZZ—ZZ of the FIG. 32.

A variation in the design is shown in FIGS. 31 and 33, in which the divergent slave petals 42 consist of two flat triangular pieces, 55 and 56, joined together via a cylindrical bearing 57 located on the diagonal of the flat surface defined by the two pieces, in such a way that the pieces can adopt different angles in order to adapt themselves to the asymmetric movement of the divergent master petals during vectoring of the thrust.

In both variations the usual support and guidance systems are provided for, consisting of pincers or hangers 58 supported on the master petals and a centralizing mechanism 54.

Figure 32:
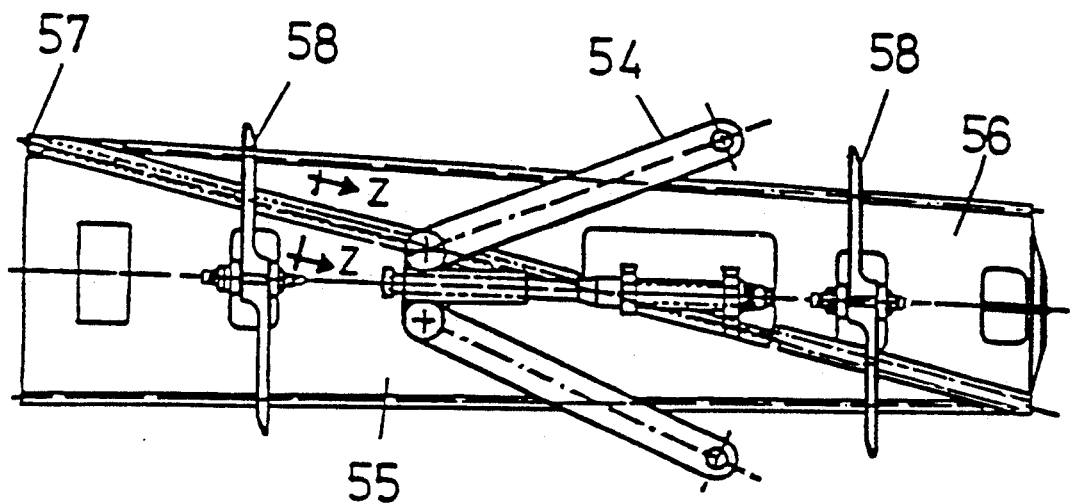
FIG. 32 is a plan view of the divergent slave petal of FIG. 31.
Figure 34:
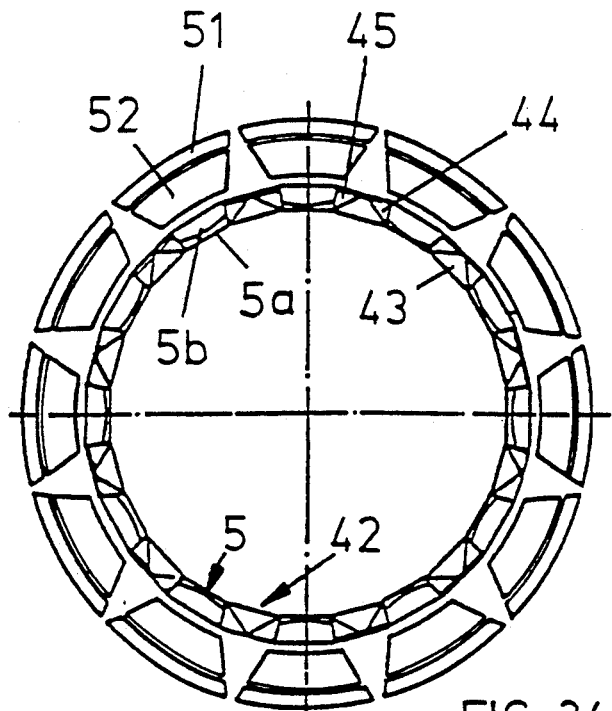
FIGS. 34 and 35 are rear views of the exhaust nozzle, without vectoring and with vectoring of the thrust and with the slave petals of FIGS. 28-30.
Figure 35:
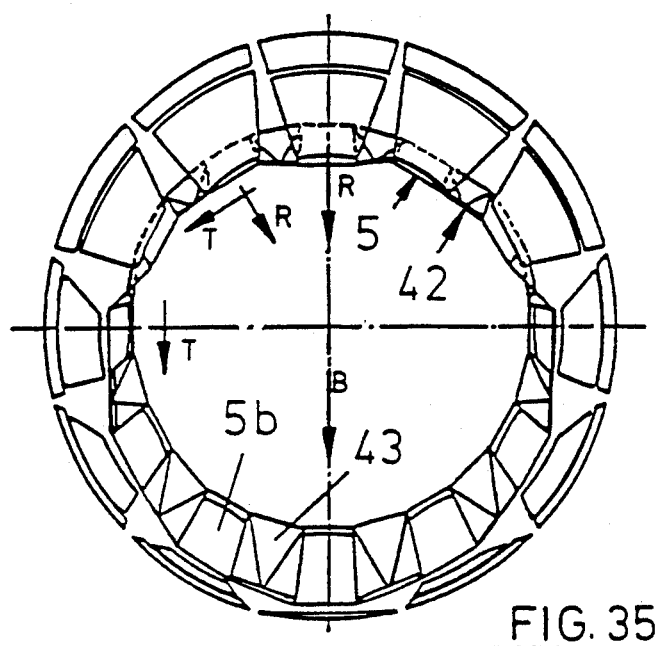
Figure 36:
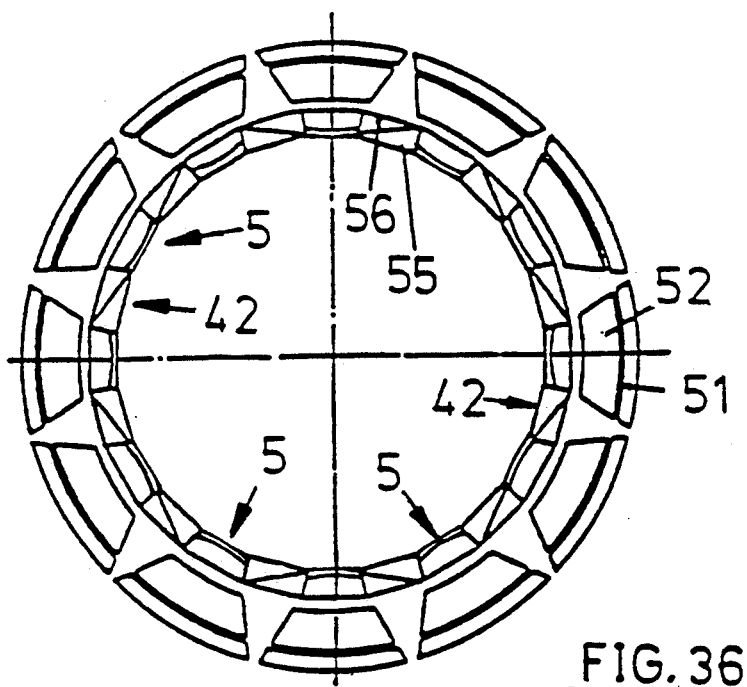
FIGS. 36 and 37 show similar views to those of FIGS. 34 and 35, with the slave petals of FIGS. 31-33.
Figure 37:
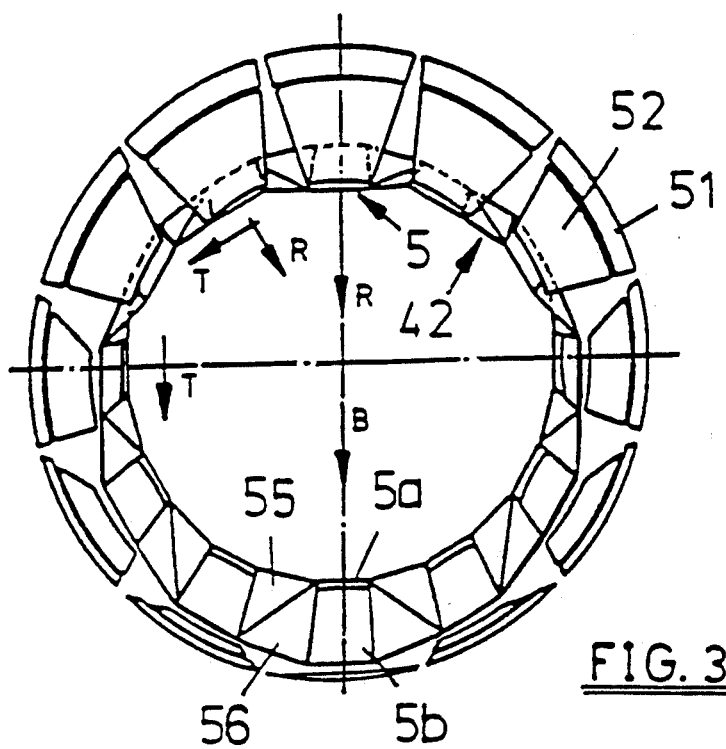

FIG. 34 shows a rear view of the exhaust nozzle without vectoring, in which the sealing between the divergent master petals is accomplished by the slave petals shown in FIGS. 28 and 30. FIG. 35 is a similar view to FIG. 34, with vectoring of the thrust shown in the direction of the arrow B. FIGS. 36 and 37 are similar views to those of FIGS. 34 and 35, but using the divergent slave petals of FIGS. 31 to 33.

Returning to FIG. 1, the exhaust nozzle includes, around the convergent section 2, a cover 50 and around the divergent section a cover consisting of elements 51 and 52. In the embodiment in FIGS. 3 to 10, the elements 51 are linked by means of spherical linkages 53 to the fixed structure and guided by the struts 12, while the elements 52 are rigidly linked to those struts 12. In the manner represented in FIGS. 12 to 16, the elements 51 are rigidly linked to the struts 12, while the elements 52 are rigidly linked to the divergent master petal 5, the cover 50 being rigidly linked to the outer ring 6.

In place of the rolling elements 22, the guide for the inner ring 8 can be made with a minimum of three cylindrical pins, linked by one end of the extension 8a of the inner ring 8, which would be displaced in the direction of the centerline inside cylindrically shaped guides fixed to the facing surface of the turbine-fixed structure.

In the designs described where the outer radial support means for the convergent petals 4 consist of a two-hinged connecting rod 16, the linkage 10 between that petal and the inner ring 8 can be spherical or cylindrical. In the same way, the linkages 17 and 18 of the ends of the connecting rod 16 can be spherical or cylindrical, so long as the linkages 10, 17 and 18 are cylindrical.

The half-rings 6a and 6b making up the outer ring 6, in the alternative shown in FIG. 25, can be joined by a cylindrical linkage consisting of two cylindrical bearings located on a diameter of a theoretic circumference which is concentric with the turbine centerline and located on a theoretic plane which is perpendicular to the turbine centerline and at opposite ends. These half-rings can also be joined by a cylindrical linkage consisting of two spherical bearings located on a diameter of a theoretical circumference which is concentric with the turbine centerline and located on a theoretical plane which is perpendicular to the turbine centerline and at opposite ends. In all cases where the outer ring is made up of two half-rings, the simultaneous governing system for the throat area and thrust vectoring will include a minimum of four linear actuators 9. These four actuators will be consecutively located at 90° to each other, two of them coinciding with the cylindrical linkage bearings.

Each of the half-rings making up the outer ring 6 may be made up of a plurality of ring segments joined together by cylindrical linkages arranged in a radial direction and guided by the turbine-fixed structure. These ring segments may be joined together by spherical linkages and guided by the turbine-fixed structure.

From the characteristics described above, it can be appreciated that an axisymmetric convergent-divergent exhaust nozzle with variable geometry can be provided having the possibility of thrust vectoring and regulation of the outlet area A9 (in the alternative of the ring 6 represented in FIG. 25), which is easily adaptable to existing turbines. Also, reduction in the mechanical and hydraulic or pneumatic elements can be achieved, as a single system simultaneously governing the throat area 15 and the outlet area A9 and the vectoring of the thrust in any direction. Furthermore, reduction in mass, simplification of the turbine control, no alteration of the sealing in the throat area 15, which remains as simple as in a non-vectorizable axisymmetric convergent-divergent exhaust nozzle, and a reduced roughness of the internal surfaces of the divergent slave petals are accomplished.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A thrust vectoring variable geometry exhaust nozzle for a gas turbine comprising:
    a convergent section defining a throat of variable area;
    a divergent section downstream of the convergent section in the direction of flow, the divergent section having a variable geometry for orienting the thrust in any direction along a theoretical cone located around a centerline of the turbine, both the convergent and divergent sections including a plurality of master petals joined together by tangential cylindrical linkages having axes perpendicular to the longitudinal axis of the gas turbine, and a plurality of slave petals joined together by sliding linkages;
    governing and outer radial support means for regulating the throat area and for regulating the vectoring of the thrust, the governing and outer radial support means comprising a governing system comprising a plurality of rings, concentric among themselves and with the centerline of the turbine, and a plurality of linear actuators having opposed upstream and downstream ends, the linear actuators being linked by the upstream ends to a fixed structure of the turbine, the plurality of rings including an outer, intermediate and inner ring;
    linkage members for linking the plurality of rings to the fixed structure of the turbine, the linkage members allowing joint axial displacement of the rings in equal magnitude with respect to the fixed structure and allowing relative rotary movement between the intermediate and outer rings and axial displacement of the outer and intermediate rings with respect to the inner ring, and for allowing the inclination of the outer ring in any direction, with the center of rotation of the outer ring directed along the centerline of the turbine; the master petals of the convergent section being linked to the inner ring, and the outer ring being connected by spherical linkages to the downstream end of the linear actuators; and
    wherein the master petals of the divergent section are transversely subdivided into at least two segments joined together by cylindrical linkages having axes perpendicular to the tangential linkages of the master petals, one of the segments being joined to the outer ring by a strut which is connected to that segment by a spherical linkage and being connected to the outer ring via a tangential cylindrical linkage having an axis perpendicular to the centerline of the turbine.

2. An exhaust nozzle according to claim 1, wherein the linkage elements that connect the plurality of rings comprise two diametrical cylindrical linkages perpendicular to each other, one of the cylindrical linkages connecting the intermediate ring to the inner ring, and the other cylindrical linkage connecting the intermediate ring to the outer ring.

3. An exhaust nozzle according to claim 1, wherein the intermediate ring comprises three concentric spherical segments which radially support each other, including two external spherical segments, and an intermediate spherical segment, each external spherical segment being linked to the outer ring, the intermediate spherical segment being connected to the inner ring.

4. An exhaust nozzle according to claim 1, further comprising a cam located upstream of the convergent section and integral with the turbine structure, wherein the governing and outer radial support means comprises a roller mounted on the cam to freely rotate around the upstream end of each of the master petals of the convergent section.

5. An exhaust nozzle according to claim 1, wherein the outer ring comprises a single body isostatically connected to the linear actuators.

6. An exhaust nozzle according to claim 1, wherein each of the slave petals of the divergent section is formed by a central plane piece having a trapezoidal shape and having a large base and a small base, an upstream edge of the central piece coincident with the large base being supported directly on the master petals of the divergent section and a downstream edge coincident with the small base being joined via a cylindrical bearing parallel to the centerline of the turbine, to another plate supported on the downstream end of the adjacent master petals of the divergent section, the central piece also being joined via cylindrical bearings to two side pieces, each having a triangular shape, which can rotate independently and absorb the movement of the master petals of the divergent section during the vectoring of the thrust.

7. An exhaust nozzle according to claim 1, wherein each of the slave petals of the divergent section comprises two approximately flat plane pieces each having a triangular shape, the flat plane pieces being joined by a cylindrical bearing located on the diagonal of the rectangular flat surface defined by the two flat plane pieces such that the two flat plane pieces can adapt themselves to movement of the master petals of the divergent section during the vectoring of the thrust.

8. An exhaust nozzle according to claim 1, wherein the linkage members comprise cylindrical pins linked at one end to the extensions of the inner and outer rings and which are displaced in the direction of the turbine centerline along the interior of cylindrically shaped guides fixed to facing surfaces of the turbine structure.

9. An exhaust nozzle according to claim 1, wherein the governing and outer radial support means comprises a connecting rod having opposed ends, one of the ends of the connecting rod being linked to the fixed turbine structure and the other end being connected to an upstream extension of a master petal of the convergent section.

10. (Amended) An exhaust nozzle according to claim 9, wherein the upstream extension and the connecting rod perform as master petals having interstices therebetween which are sealed by slave petals.

11. An exhaust nozzle according to claim 1, wherein the governing and outer radial support means comprises a two-hinged connecting rod having opposed ends, the rod being joined at one end to the fixed turbine structure and at the other end to an intermediate point of a master petal of the convergent section.

12. An exhaust nozzle according to claim 11, wherein the master petals of the convergent section are linked to the inner ring by a tangential cylindrical linkage having an axis perpendicular to the centerline of the turbine, and the two-hinged connecting rod being linked to the fixed turbine structure and to the master petals of the convergent section via tangential cylindrical linkages having axes perpendicular to the centerline of the turbine.

13. An exhaust nozzle according to claim 11, wherein the master petals of the convergent section are linked to the inner ring by tangential cylindrical linkages having axes perpendicular to the centerline of the turbine, and the two-hinged connecting rod is linked to the fixed structure of the turbine and to the master petals of the convergent section via spherical linkages.

14. An exhaust nozzle according to claim 11, wherein the convergent master petals are linked to the inner ring by a spherical linkage, and the two-hinged connecting rod (16) is linked to the fixed structure of the turbine and to the master petals of the convergent section via tangential cylindrical linkages having axes perpendicular to the centerline of the turbine.

15. An exhaust nozzle according to claim 1, wherein the linkage member for the rings comprise cylindrical extensions of the inner and outer rings, said cylindrical extensions facing in the upstream direction and overlapping with facing concentric surfaces of the turbine structure, the extensions and the facing surfaces being connected via rolling elements that allow axial displacement of the inner and outer rings with respect to the turbine structure, and which allow movement of the outer ring over a spherical surface having a center point on the turbine centerline.

16. An exhaust nozzle according to claim 15, wherein the rolling elements comprise freely rotating rollers mounted in facing surfaces of the turbine structure, which move along guides fixed in the extensions of the inner and outer rings.

17. An exhaust nozzle according to claim 15, wherein the rolling elements comprise freely rotating rollers mounted on the extensions of the inner and outer rings which move along guides fixed to facing surfaces of the turbine structure.

18. An exhaust nozzle according to claim 17, wherein the rollers and rails of the linkage members linking the extensions of the outer ring and the facing surfaces of the turbine structure are spaced to provide sufficient clearance to allow the rotation of the outer ring during the vectoring of the thrust.

19. An exhaust nozzle according to claim 1, wherein the outer ring comprises two half-rings joined together by a cylindrical linkage having an axis which coincides with the axis of the cylindrical linkage joining the outer ring to the intermediate ring, each half-ring independently rotating around the axis of the cylindrical linkage joining both half-rings, the two half-rings being located in different planes thereby varying the area of the nozzle outlet via struts linking the master petals of the divergent section to the outer ring.

20. An exhaust nozzle according to claim 19, wherein the two half-rings of the outer ring are joined by a cylindrical linkage formed from two cylindrical bearings located on a diameter of the turbine and at opposite ends of the turbine.

21. An exhaust nozzle according to claim 19, wherein the two-half rings of the outer ring are joined by a cylindrical linkage formed from two spherical bearings located on a diameter of the turbine and at opposite ends of the turbine.

22. An exhaust nozzle according to claim 19, wherein each of the two half-rings of the outer ring is formed from a plurality of ring segments joined together by cylindrical linkages arranged radially and guided by the fixed structure of the turbine.

23. An exhaust nozzle according to claim 19, wherein each of the half-rings of the outer ring is formed from a plurality of ring segments joined together by spherical linkages and guided by the fixed structure of the turbine.

24. An exhaust nozzle according to claim 19, wherein the governing system for regulating the throat area and the thrust vectoring has a minimum of four linear actuators connected to the outer ring.

25. An exhaust nozzle according to claim 24, wherein the four linear actuators are consecutively located at 90° to each other, two of the linear actuators coinciding with the bearings of the cylindrical linkage.

* * * * *